(12) United States Patent
Sugaya et al.

(10) Patent No.: US 7,477,592 B2
(45) Date of Patent: Jan. 13, 2009

(54) OPTICAL DISC, OPTICAL DISC APPARATUS, OPTICAL DISK REPRODUCING METHOD, AND DIGITAL WORK PUBLICATION

(75) Inventors: Toshihiro Sugaya, Moriya (JP);
Naomasa Nakamura, Yokohama (JP);
Nobuhisa Yoshida, Kamakura (JP);
Masato Otsuka, Tokyo (JP)

(73) Assignees: Kabushiki Kaisha Toshiba, Tokyo (JP);
Memory-Tech Corporation, Chikuse, Ibaraki (JP)

( * ) Notice: Subject to any disclaimer, the term of this patent is extended or adjusted under 35 U.S.C. 154(b) by 609 days.

(21) Appl. No.: 11/293,371

(22) Filed: Dec. 5, 2005

(65) Prior Publication Data
US 2006/0126485 A1    Jun. 15, 2006

(30) Foreign Application Priority Data
Dec. 14, 2004    (JP)    ............................. 2004-361809

(51) Int. Cl.
*G11B 7/00*    (2006.01)
(52) U.S. Cl. ................. 369/275.1; 369/53.2; 369/53.41; 369/47.1
(58) Field of Classification Search ........................ None
See application file for complete search history.

(56) References Cited

U.S. PATENT DOCUMENTS 6,221,455 B1    4/2001    Yasuda et al.
6,670,014 B2    12/2003    Nishihara et al.

(Continued)

FOREIGN PATENT DOCUMENTS

JP    2002-074742    3/2002

(Continued)

OTHER PUBLICATIONS

ECMA Standardizing Information and Communication, Standard EMCA-267 3rd Edition—Apr. 2001, pp. 1-83.

*Primary Examiner*—Muhammad N. Edun
(74) *Attorney, Agent, or Firm*—Pillsbury Winthrop Shaw Pittman, LLP

(57) ABSTRACT

An optical disc of this invention is configured to be capable of dealing with both information in HD DVD and information in DVD. The optical disc is basically specified by the following items (1) to (7): (1) the optical disc is a single-sided dual layer optical disc where a light transmission layer, a first recording layer accessed with a first laser beam, an space layer, and a second recording layer accessed with a second laser beam are arranged in that order in the direction in which the laser beam enters, (2) the areal recoding density of the second recording layer is three times or more as high as that of the first recording layer, (3) identifying information which indicates that the first recording layer has been formed is formed in the second recording layer, (4) the distance in the light transmission layer from the incidence plane to the first recording layer is 550 µm or more, (5) the distance in the light transmission layer from the incidence plane to the second recording layer is 622 µm or less, (6) the reflectivity of the first recording layer with respect to the first laser beam is 45% to 65%, and (7) the reflectivity of the second recording layer with respect to the second laser beam is 15% to 29%.

10 Claims, 17 Drawing Sheets

U.S. PATENT DOCUMENTS

| | | | |
|---|---|---|---|
| 7,385,907 B2 * | 6/2008 | Vlutters et al. | 369/275.2 |
| 2003/0081523 A1 * | 5/2003 | Miyagawa et al. | 369/59.11 |
| 2004/0166439 A1 | 8/2004 | Ohkubo | |
| 2005/0174924 A1 * | 8/2005 | Martens et al. | 369/275.4 |

FOREIGN PATENT DOCUMENTS

| | | |
|---|---|---|
| JP | 2002-100072 | 4/2002 |
| JP | 2004-206854 | 7/2004 |

* cited by examiner

F I G. 2A  Normal single layer

F I G. 2B  Thin single layer

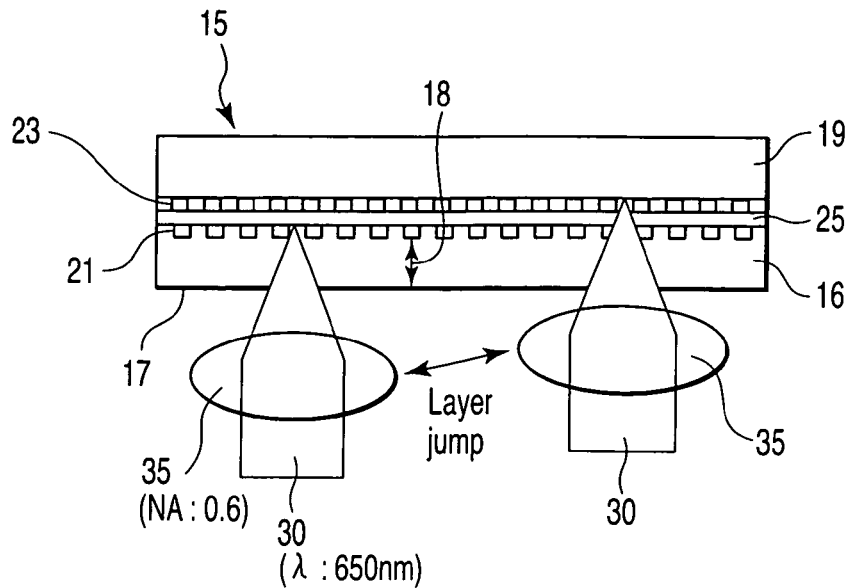
F I G. 3
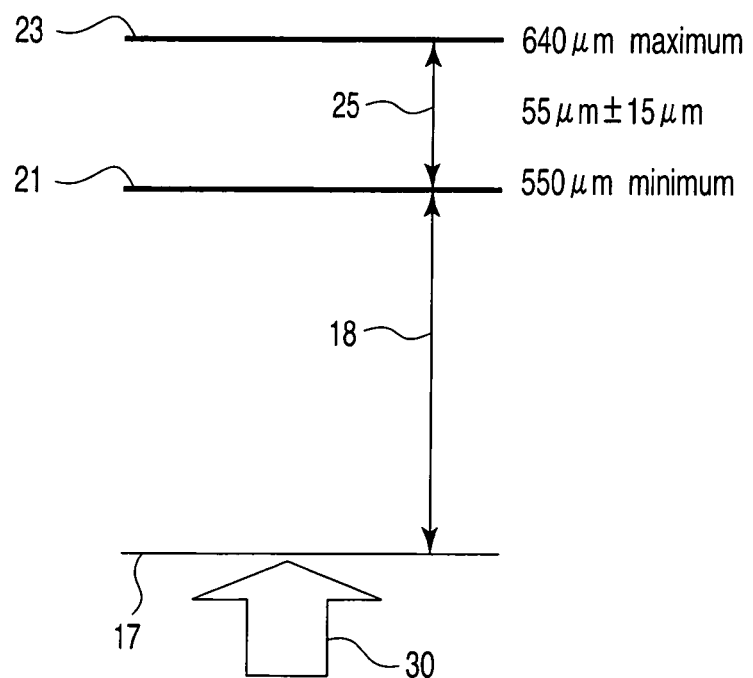
F I G. 4

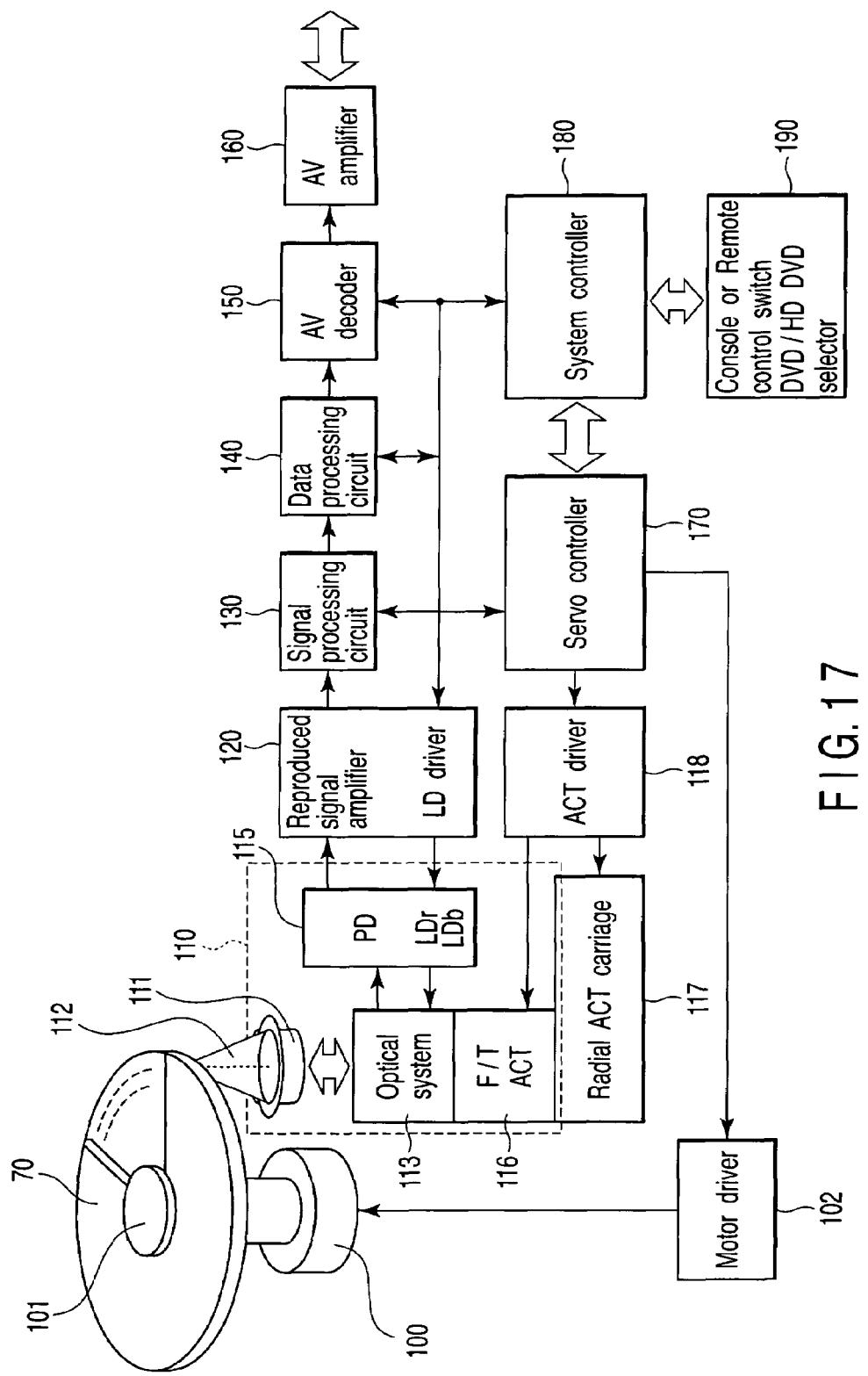
F I G. 17

Thickness of light transmission layer and that of space layer

| Thickness of Ag alloy film (nm) | Thickness of light transmission layer | | Thickness of space layer | |
|---|---|---|---|---|
| | Min | Max | Min | Max |
| 18 | 558 | 571 | 32.8 | 42.3 |

FIG. 19A

Jitter and reflectivity of DVD

| Thickness of Ag alloy film (nm) | Jitter (%) | | | Reflectivity (%) | |
|---|---|---|---|---|---|
| | 24 mm in radius | 40 mm in radius | 55 mm in radius | Min | Max |
| 18 | 6.19 | 6.19 | 5.90 | 48.7 | 50.5 |

FIG. 19B

OPTICAL DISC, OPTICAL DISC APPARATUS, OPTICAL DISK REPRODUCING METHOD, AND DIGITAL WORK PUBLICATION

CROSS-REFERENCE TO RELATED APPLICATIONS

This application is based upon and claims the benefit of priority from prior Japanese Patent Application No. 2004-361809, filed Dec. 14, 2004, the entire contents of which are incorporated herein by reference.

BACKGROUND OF THE INVENTION

1. Field of the Invention

This invention relates to an optical disc acting as a medium which stores digitized audio and visual content, including movies and music, such as DVD (Digital Versatile Disc). This invention further relates to an optical disc apparatus which reads the recorded information on the optical disc, an optical disc reproducing method, and a digital work publication using the optical disc as a recording medium.

2. Description of the Related Art
<Outline of the DVD Standard>

One known type of optical disc for storing digital images is DVD (Digital Versatile Disc), which has been widely used all over the world mainly in storing and delivering movie content (digital publications). DVD is the standard determined by the DVD Forum, which is open to the public as the DVD standard (DVD Book) (refer to www.dvdforum.org). The DVD standard has also been determined in International standards and JIS. Here, ECMA-267 is a document related to the International standard for 120 mm DVD-ROM, one of the DVD physical standards. Hereinafter, a brief explanation will be given referring to ECMA-267.

There are four types of 120 mm DVD-ROM: single-sided single layer, single-sided dual layer, double sided single layer, and double sided dual layer. In delivery of an accumulation of content, such as movies, there are two types of single-sided discs: one is a single-sided single layer disc with a capacity of 4.7 GB and the other is a single-sided dual layer disc with a capacity of 4.27 GB per layer (a total capacity of 8.54 GB per disc).

The development of a disc whose capacity is larger than that of the aforementioned DVD (referred to as the existing DVD) has been desired. This comes from a desire to store HD (High Definition) images on a single disc (temporarily referred to as the next-generation DVD).

[Non-patent Document] ECMA-267

If the next generation DVD has been developed, it will be possible to design a next-generation DVD device (drive or player) for the next-generation DVD so as to read not only the next-generation DVD but also the existing DVD. Since the next-generation DVD differs from the existing DVD in recording density, modulation system, signal processing, track format, and the like, a conventional DVD device (drive or player) cannot read the data from the next-generation DVD. That is, the conventional DVD device has the disadvantage of being unable to read not only the HD movie content recorded on the next-generation DVD disc but also the conventional DVD movie content recorded on the next-generation DVD, which may lead to a factor that hinders the spread of the next-generation DVD.

BRIEF SUMMARY OF THE INVENTION

It is, accordingly, an object of the present invention to provide an optical disc, an optical disc apparatus, and an optical disc reproducing method which enable a single disc to deal with not only the information recorded on the next-generation DVD but also the information recorded on the existing DVD, and further provide a digital publication using an optical disc as a recording medium.

It is another object of the present invention is to provide an optical disc, an optical disc apparatus, and an optical disc reproducing method which enable a conventional DVD apparatus to recognize DVD and an HD DVD/DVD compatible apparatus to recognize both HD DVD and DVD, and further provide a digital work publication using the optical disc as a recording medium.

According to one aspect of the present invention, there is provided a single-sided dual layer optical disc comprising: a light transmission layer; a translucent first recording layer which is accessed with a first laser beam; an space layer; and a second recording layer which is accessed with a second laser beam, these layers being arranged in that order in the direction in which a laser beam enters, the areal recording density of the second recording layer being three times or more as high as that of the first recording layer, identifying information to indicate that the first recording layer has been formed being formed in the second recording layer, the thickness of the light transmission layer from an incidence plane to the first recording layer being 550 µm or more, the thickness of the light transmission layer from the incidence plane to the second recording layer being 622 µm or less, the reflectivity of the first recording layer with respect to the first laser beam being 45% to 65%, and the reflectivity of the second recording layer with respect to the second laser beam being 15% to 29%.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows the relationship between the basic structure of a single-sided dual layer DVD disc and an optical head;

FIG. 4 shows the position of the recording layer of the single-sided dual layer DVD disc;

FIG. 17 shows a configuration of an optical disc apparatus of the present invention;

FIGS. 19A and 19B show examples of the characteristic of a trial optical disc related to the present invention.

DETAILED DESCRIPTION OF THE INVENTION

Hereinafter, referring to the accompanying drawings, embodiments of the present invention will be explained. To make it easier to understand the present invention, the technologies of the existing DVD and the next-generation DVD will be explained. Then, the basic configuration of the next-generation DVD according to the present invention will be explained using FIG. 8 and subsequent figures.

<Single-sided Single Layer DVD>

Figure 1:
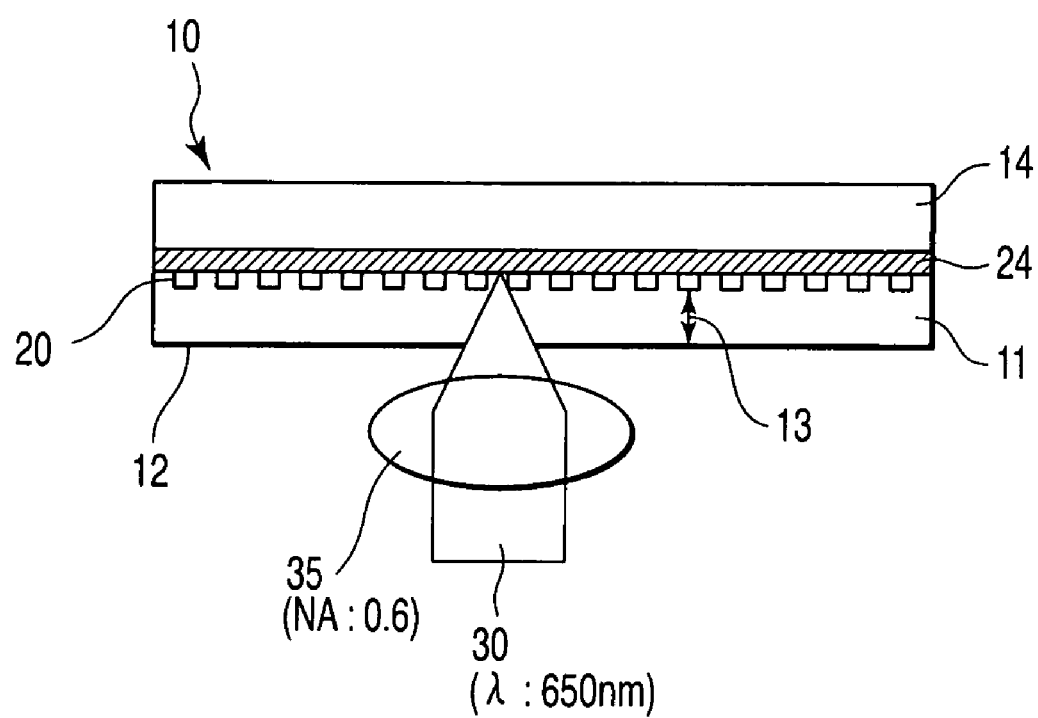
FIG. 1 shows the relationship between the basic structure of a single-sided single layer DVD disc and an optical head.

FIG. 1 shows the relationship between the basic structure of a single-sided single layer DVD disc 10 and an optical head. As is well known, the DVD disc 10 has such a structure as bonded two 0.6 mm thickness disc substrates together. One of the substrates is a signal substrate 11 and the other is a dummy substrate 14. The signal substrate and the dummy substrate are bonded together with an adhesive layer 24 in such a manner that a recording layer 20 lies between the two substrates. Generally, these substrates are made of such plastic material as polycarbonate with an injection molding machine.

In the signal substrate 11, video information, data information, and the like are recorded in a spiral track in the form of emboss pits. Red laser light 30 (with a wavelength of 650 nm) for reading the information in the recording layer is converged at an objective lens 35 (with NA of 0.6), passes through a light transmission layer 13 of the signal substrate 11, and is focused on the recording layer 20.

Figure 2:
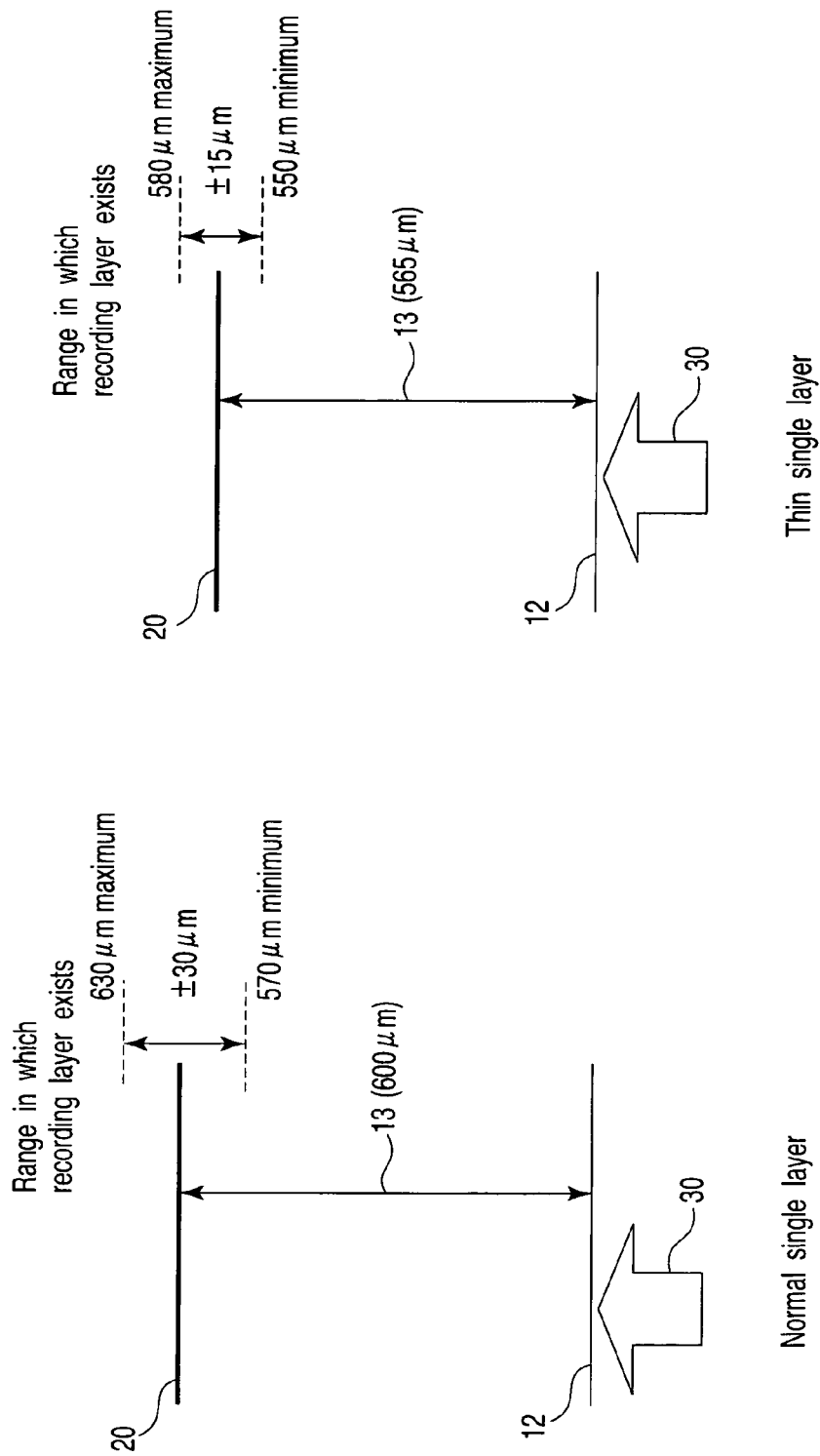
FIGS. 2A and 2B are diagrams to help explain the position of the recording layer of the single-sided single layer DVD disc.

Each of FIGS. 2A and 2B shows the position of the recording layer of a single-sided single layer disc when viewed from an incidence plane 12. FIG. 2A shows a normal single layer conventionally used. In the normal single layer, the center value of the thickness of the light transmission layer 13 is 600 μm and lies in a position a minimum distance of 570 μm and a maximum distance of 630 μm away from the incidence plane. The value is determined, taking the spherical aberration of the objective lens 35 into account. Recently, a thin single layer where the center value of the recording layer is 565 μm and lies in a position a minimum distance of 550 μm and a maximum distance of 580 μm away from the incidence plane as shown in FIG. 2B even in a single-sided single layer disc has been added to the DVD standard (refer to www.dvd-forum.org or DVD Book). In this disc, jitter is determined less than 7% to secure interchangeability in reading with a conventional apparatus, whereas in the normal signal layer, jitter is determined less than 8%.

<Single-sided Dual Layer DVD>

FIG. 3 shows the relationship between the basic structure of a single-sided dual layer disc 15 and an optical head. As is well known, this disc has a first recording layer 21 and a second recording layer 23. The two recording layers can be accessed from one side of the disc, thereby reproducing the signal. In FIG. 3, when viewed from the incidence plane 17, there are a light transmission layer 18, the first recording layer 21, and the second recording layer 23 in that order. The individual recording layers are accessed by moving the objective lens 35 with a lens actuator and causing the objective lens 35 to make a layer jump.

The dual layer disc is characterized in that it can be produced almost in the same manner as a single-sided single layer disc. A signal substrate 16 where the first recording layer 21 is to be formed and a signal substrate 19 where the second recording layer 23 is to be formed are produced separately with an injection molding machine. Next, a translucent film is provided on the first recording layer 21 and a high-reflectivity film is provided on the second recording film 23. Then, the two substrates are bonded together with a space layer 25 in such a manner that the recording layers lie between the two substrates, which completes the disc.

FIG. 4 shows the position of the recording layers when viewed from the incidence plane 17 of the single-side dual layer disc. The first recording layer 21 is limited to a position a minimum distance of 550 μm away from the incidence plane and the second recording layer 23 is limited to a position a maximum distance of 640 μm away from the incidence plane and the distance between the two layers (or space layer 25) is set as 55±15 μm (40 to 70 μm), taking into account the spherical aberration of the objective lens and crosstalk between the recording layers. The space layer 25 is generally equal to the thickness of the adhesive layer with which the two substrates are bonded. In an actual manufacture, the distance is determined, taking into account the bonding accuracy and the formation accuracy of the signal substrate 16. The linear recording density is reduced by 10% in a single-sided single layer disc. The capacity per layer is 4.27 GB. Jitter is less than 8%.

<Reflectivity and Others of the Recording Layers>

The reflectivities of the recording layers are determined as follows:

Single layer disc: 45% to 85% (with PBS), 60% to 85% (without PBS: circular polarized light)

Dual layer disc: 18% to 30% (with PBS), 18% to 30% (without PBS: circular polarized light)

Information indicating the Reflectivity of the disc is b29 in a 4-byte ID (Identification Data) in a Data frame:

0b: when the Reflectivity is larger than 40% (with PBS)

1b: when the Reflectivity is equal to or smaller than 40% (with PBS)

Moreover, in the ID, the following have been written:

Area type b27 to b26

00b In the Data area

01b In the Lead-in area

10b In the Lead-out area

11b In the Middle area

Data type b25

0b Read-only data

1b Other than Read-only data

Layer number b24

0b Layer0 of DL discs or on SL discs

1b Layer 1 of DL discs

As for information as to whether the disc has a single layer or a dual layer, a disc structure is defined in byte position BP2 (the second byte position) in the Control data zone. In the information, b5 and b6 represent the Number of recording layers:

00b Single
01b Dual
Others: reserved

Furthermore, the capacity per layer in a single layer disc differs from that in a dual layer disc, since the single layer disc differs from the dual layer disc in linear recording. Recording density is defined in BP3 in such a manner that b7 to b4 represent a linear recording density as follows:

0000b: 0.267 μm (the linear recording density for a single layer)
0001b: 0.293 μm (the linear recording density for a dual layer)

<Next-generation DVD>

As frequently reported in recent years, a blue-violet semiconductor laser (hereinafter, referred to as blue-violet laser) HD DVD whose areal recording density is three times or more as high as that of DVD has been proposed to satisfy the desire to store HD (High Definition) images on a single disc. The blue-violet laser HD DVD has been standardized in the DVD Forum (refer to www.dvdforum.org. It has not been produced yet on a commercial basis).

HD DVD has the same disc structure as that of a conventional DVD. A single-sided single layer HD DVD has a capacity of 15 GB and a dual sided dual layer HD DVD has a capacity of 30 GB. These large capacities have been realized by new techniques, including a shorter wavelength of laser light, a larger NA, a modulation system, and new signal processing (PRML: Partial Response and Most Likelihood).

Figure 5:
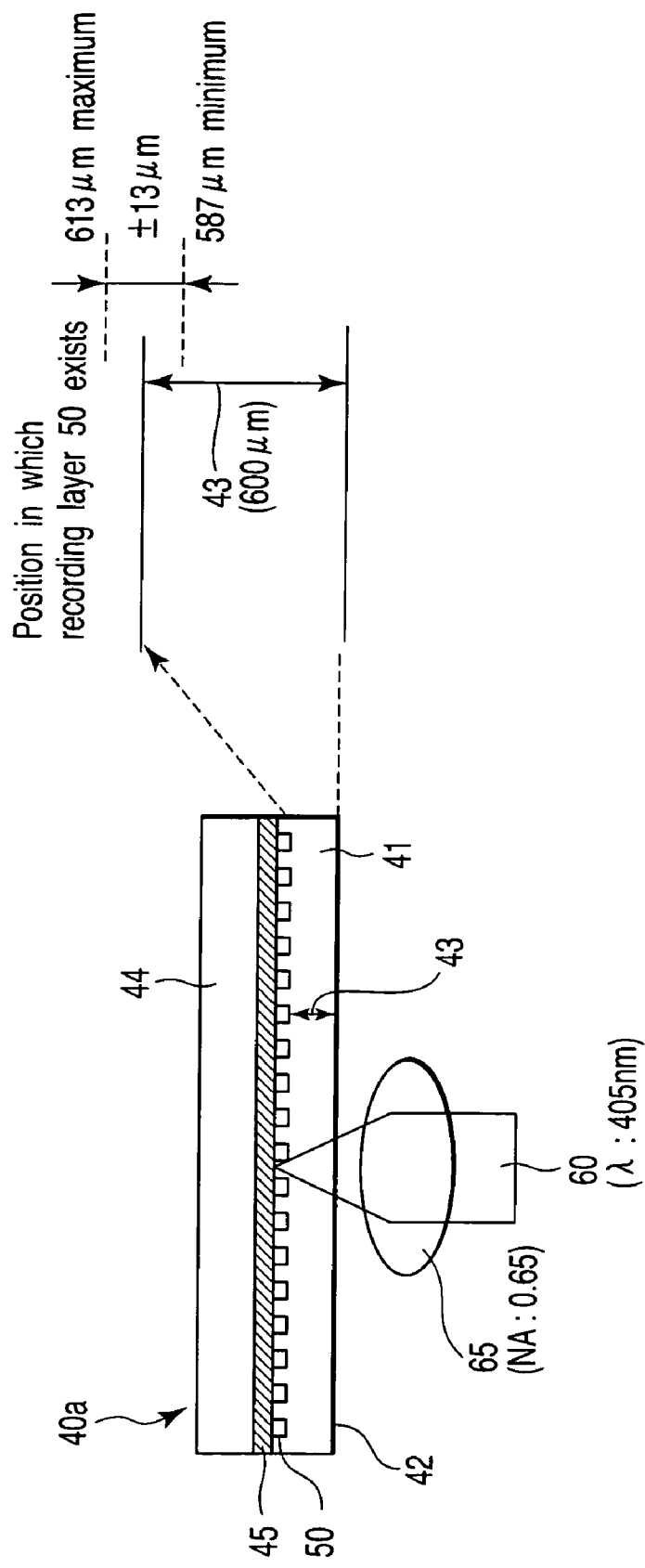
FIG. 5 shows the relationship between the basic structure of a single-sided single layer HD DVD disc and an optical head.

FIG. 5 shows the relationship between the basic structure of a single-sided single layer HD DVD disc 40a and an optical head. Like the DVD disc 10, the HD DVD 40a has such a structure as has two 0.6 mm thickness disc substrates bonded together. One is a signal substrate 41 and the other is a dummy substrate 44. The two substrates are together with an adhesive layer 45 in such a manner that a recording layer 50 between the two substrates. The center value of a light transmission layer 43 is 600 μm. Because of the spherical aberration of the objective lens 65, the light transmission layer 43 has a maximum value of 613 μm and a minimum value of 587 μm. A recording layer 50 formed at the signal substrate 41 is read with a blue-violet laser beam 60 (with a wavelength of 405 nm) converged with the objective lens 65 (with an NA of 0.65).

Figure 6:
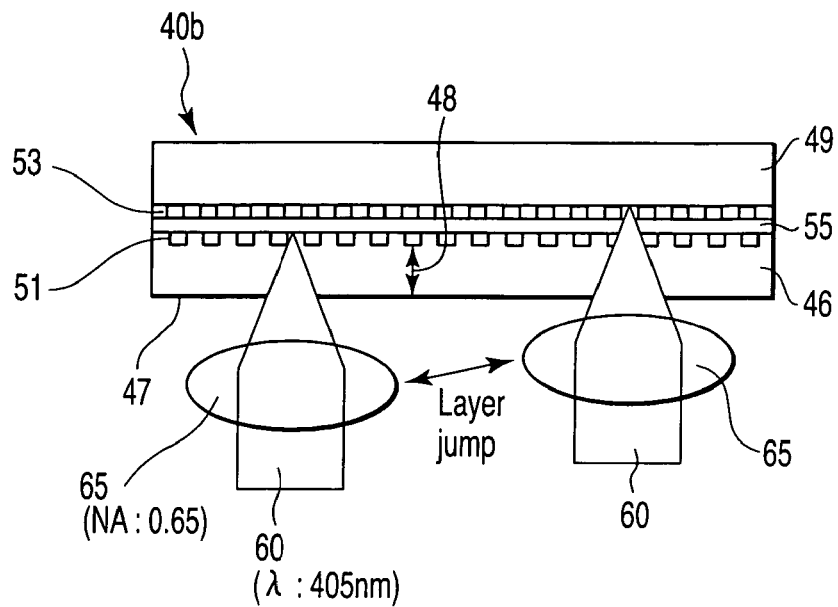
FIG. 6 shows the relationship between the basic structure of a single-sided dual layer HD DVD disc and an optical head.

FIG. 6 shows the relationship between the basic structure of a single-sided dual layer HD DVD disc 40b and an optical head. The HD DVD disc 40b has such a structure as has a signal substrate 46 (where a recording layer L0 51 has been formed) and a signal substrate 49 (where a recording layer L1 53 has been formed) bonded together with an space layer 55. As in DVD, causing the focused position of the laser beam to jump between the recording layers enables the recording layer L0 51 or L1 53 to be accessed from one side of the disc.

Figure 7:
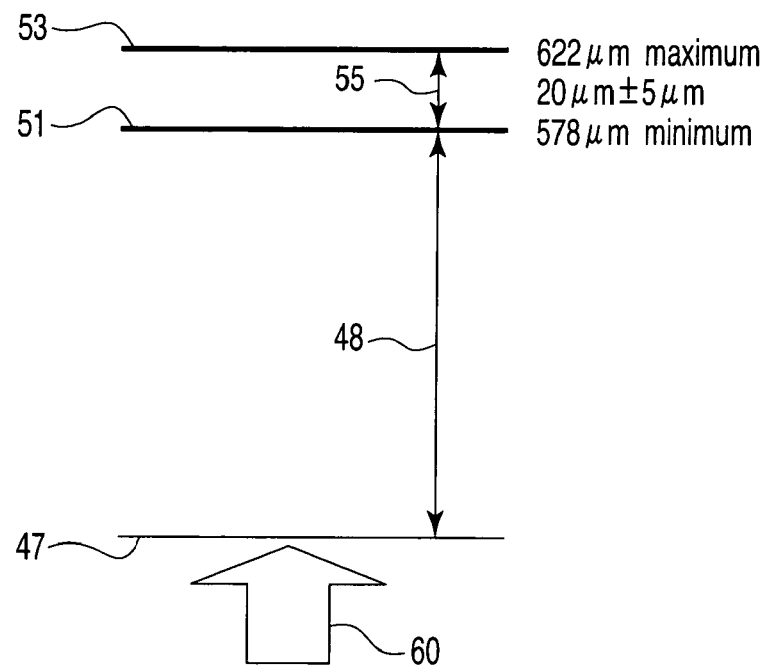
FIG. 7 shows the position of the recording layer of the single-sided dual layer HD DVD disc.

FIG. 7 shows the positions of the recording layers of the single-sided dual layer HD DVD when viewed from the incidence plane 47. Since the spherical aberration becomes severer as a result of making the wavelength shorter and NA larger, the first recording layer 51 is limited to a position a minimum distance of 578 μm away from the incidence plane and the second recording layer 53 is limited to a position a maximum distance of 622 μm away from the incidence plane. The distance between the two layers (or space layer 55) is set as 20±5 μm (15 to 25 μm).

<Existing DVD and Next-generation DVD>

If a large capacity HD DVD capable of accumulating HD images is proposed, an HD DVD apparatus (drive or player) can be newly designed so that it can read not only HD DVD but also DVD. However, since the HD DVD differs greatly from the DVD in recording density, modulation system, signal processing, track format, and others, a conventional DVD apparatus (drive or player) cannot read the data from the HD DVD disc. That is, the conventional DVD apparatus has the problem of being unable to read not only the HD movie content recorded on the HD DVD disc but also the conventional DVD movie content recorded on the HD DVD disc.

To overcome this problem, the inventors of this invention have come up with an optical disc which enables a single disc to handle not only the information recorded on HD DVD but also the information recorded on DVD, and further with an optical disc which enables a conventional DVD apparatus to recognize DVD and an HD DVD/DVD compatible apparatus to recognize both HD DVD and DVD.

<The Basic Concept of this Invention is as Follows>

An optical disc according to the present invention is basically specified by the following items (1) to (7):

(1) The optical disc is a single-sided dual layer optical disc where a light transmission layer, a first recording layer accessed with a first laser beam, an space layer, and a second recording layer accessed with a second laser beam are arranged in that order in the direction in which the laser beam enters.

(2) The areal recoding density of the second recording layer is three times or more as high as that of the first recording layer.

(3) Identifying information which indicates that the first recording layer has been formed is formed in the second recording layer.

(4) The distance in the light transmission layer from the incidence plane to the first recording layer is 550 μm or more.

(5) The distance in the light transmission layer from the incidence plane to the second recording layer is 622 μm or less.

(6) The reflectivity of the first recording layer with respect to the first laser beam is 45% to 65%.

(7) The reflectivity of the second recording layer with respect to the second laser beam is 15% to 29%.

Moreover, the optical disc of the present invention can be embodied on the basis of not only the above basic items but also the following items (8) to (10):

(8) The thickness of the light transmission layer from the incidence plane to the first recording layer is 575 μm or less.

(9) The thickness of the light transmission layer from the incidence plane to the second recording layer is 578 μm or more.

(10) The thickness of the space layer is 28 to 47 μm.

In addition, the optical disc of the present invention can be embodied on the basis of not only the above items but also the following items (11) and (12):

(11) The first recording layer, which is made of an Ag alloy film, has a thickness of 15 to 23 nm.

(12) The second recording layer, which is made of an Al alloy film, has a thickness of 30 nm or less.

An optical disc apparatus according to the present invention is specified by the following items (13) to (20):

(13) The optical disc is a single-sided dual layer optical disc where a light transmission layer, a first recording layer accessed with a first laser beam, an space layer, and a second recording layer accessed with a second laser beam are arranged in that order in the direction in which the laser beam enters.

(14) The areal recoding density of the second recording layer is three times or more as high as that of the first recording layer.

(15) Identifying information which indicates the first recording layer has been formed is formed in the second recording layer.

(16) The distance in the light transmission layer from the incidence plane to the first recording layer is 550 μm or more.

(17) The distance in the light transmission layer from the incidence plane to the second recording layer is 622 μm or less.

(18) The reflectivity of the first recording layer with respect to the first laser beam is 45% to 65%.

(19) The reflectivity of the second recording layer with respect to the second laser beam is 15% to 29%.

(20) An information reading apparatus includes an optical head capable of generating a first laser beam and a second laser beam and control means for selectively causing either the first laser beam or the second laser beam to be generated.

Moreover, the optical disc apparatus of the present invention can be embodied on the basis of not only the above items but also the following item (21):

(21) The control means selects either the first laser beam or the second laser beam on the basis of the user input from a user interface.

In addition, the optical disc apparatus of the present invention can be embodied on the basis of not only the above items but also the following item (22):

(22) The control means selects the second laser beam in an initial process of trying reading the information recorded on the installed optical disc.

Furthermore, the optical disc apparatus of the present invention can be embodied on the basis of not only the above items but also the following item (23):

(23) The control means, when having succeeded in reading the information in the initial process, continues selecting the second laser beam until a user input to select the first laser beam has been supplied from the user interface.

The above means makes it possible to provide an optical disc which enables a first recording layer (corresponding to a DVD layer) and a second recording layer (corresponding to an HD DVD layer) to be accessed from one side with a first laser beam (or red laser light) and a second laser beam (blue-violet laser light), respectively. Then, in the conventional DVD apparatus, the optical disc of this invention operates as a DVD disc, whereas in the compatible apparatus capable of dealing with both HD DVD and DVD, the optical disc operates as both an HD DVD disc and a DVD disc.

Therefore, both DVD movie content and HD DVD movie content can be recorded into a single disc. That is, this disc is a combination disc capable of dealing with both SD video and HD video.

A conventional DVD compatible optical disc apparatus can reproduce DVD content. A new HD DVD compatible optical disc apparatus can reproduce HD DVD movie content or both HD DVD movie content and DVD movie content.

For instance, the same movie content is prepared in the form of DVD content and HD DVD content. These two movie contents are recorded into a single disc. This enables the user having only a DVD compatible apparatus to watch the DVD movie content and the user having an HD DVD compatible apparatus to watch the HD DVD movie content.

If the user who does not have an HD DVD compatible apparatus buys an HD DVD compatible apparatus in the future, the user can enjoy the HD video on the already bought discs without buying a new HD DVD disc. This provides a great benefit to the user.

<Basic Configuration of Optical Disc>

Figure 8:
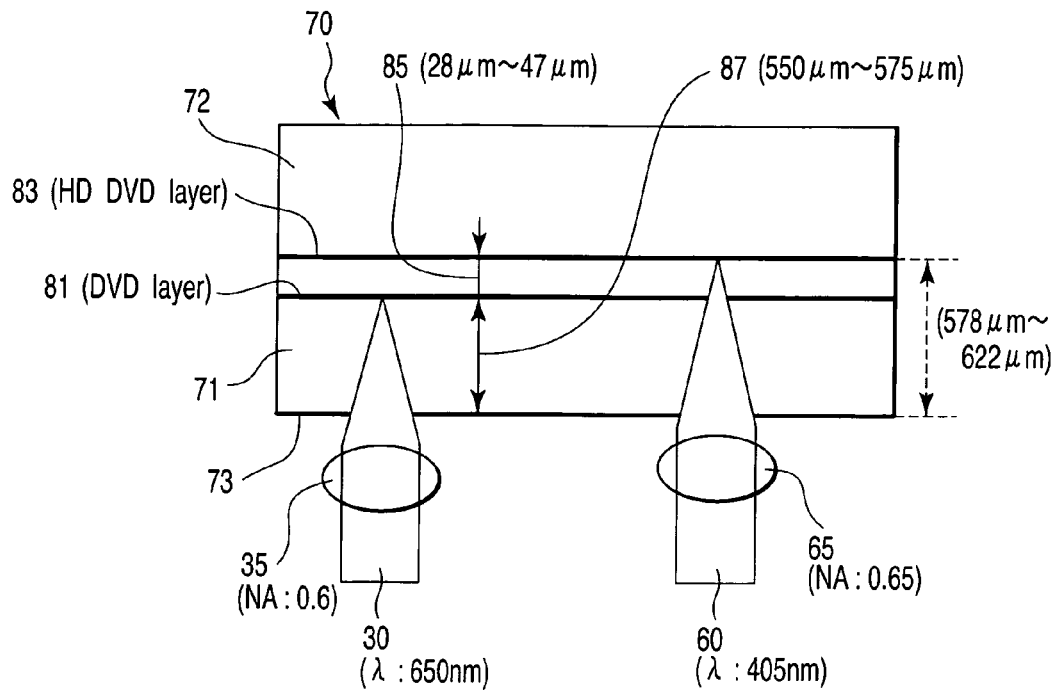
FIG. 8 shows the relationship between an optical disc of the present invention and the reproducing optical system.

FIG. 8 shows the relationship between an optical disc 70 according to an embodiment of the present invention and an optical head. The optical disc 70 is composed of a first signal substrate 71 and a second signal substrate 72. In the optical disc 70, a first recording layer (corresponding to a DVD layer) 81 made of a translucent film is formed closer to the incidence plane 73 of a laser beam and a second recording layer (corresponding to an HD DVD layer) 83 made of a high reflection film is formed less close to the incidence plane.

Figure 9:
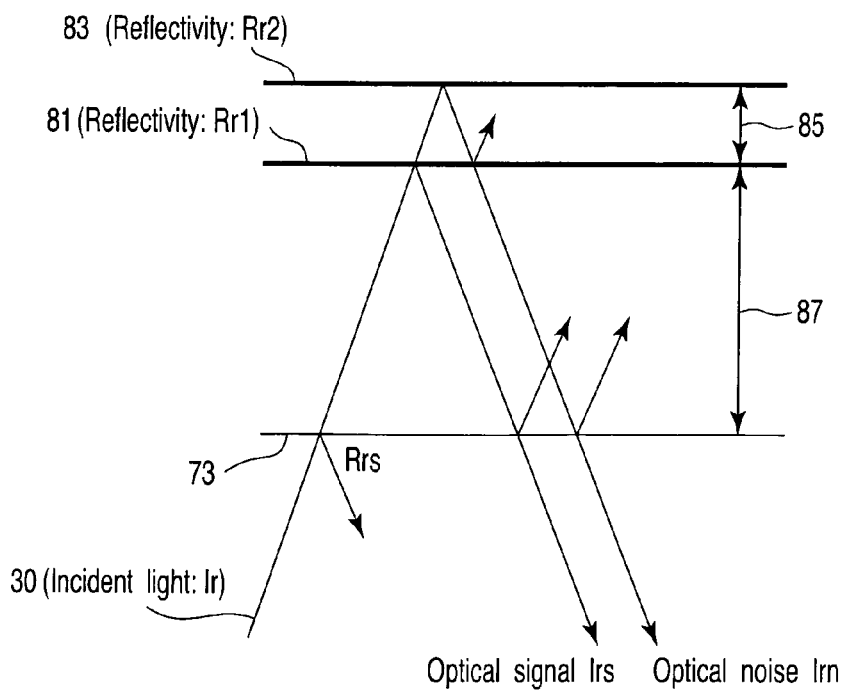
FIG. 9 shows the relationship between an optical disc of the present invention and red laser light.
Figure 10:
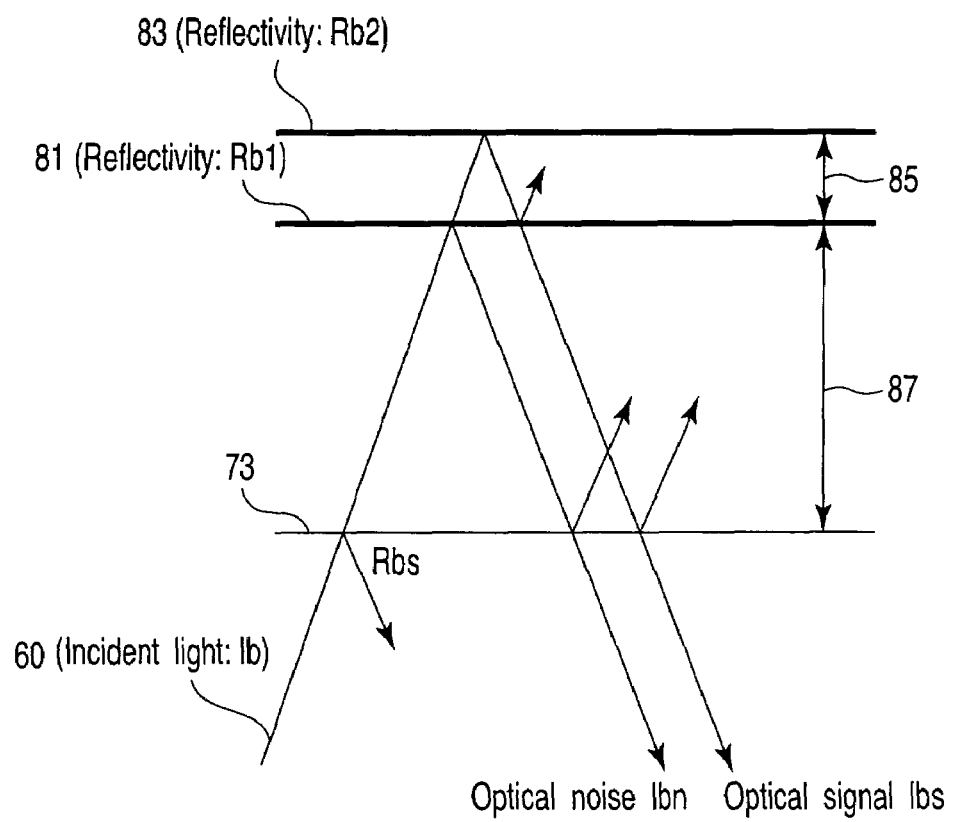
FIG. 10 shows the relationship between an optical disc of the present invention and blue-violet laser light.

FIG. 9 shows a state where the information recorded in the first recording layer (DVD layer) 81 is reproduced with the red laser beam 30 and FIG. 10 shows a state where the second recording layer (HD DVD layer) 83 with the blue-violet laser beam 65. To reproduce data from the HD DVD layer 83 with a blue-violet laser beam, the HD DVD layer has to be a minimum distance of 578 μm and a maximum distance of 622 μm away from the incidence plane (because of limitations of spherical aberration) as seen from FIG. 7. In addition, if the DVD layer 81 is a thin single layer shown in FIG. 2B, the DVD layer 81 has to be a minimum distance of 550 μm and a maximum distance of 580 μm away from the incidence plane (550 μm minimum is a limitation imposed by spherical aberration). The space layer 85 is determined, taking into account a crosstalk occurring between the DVD layer 81 and the HD DVD layer 83. In the case of the HD DVD, the space layer 85 has a thickness of 15 μm or more. In the case of the DVD, the space layer 85 has a thickness of 40 μm. Both cases depend on the optical system.

In the first substrate 71, the DVD 81 is formed. At the same time, the blue-violet laser beam to reproduce data from the HD DVD layer 83 also passes through. Taking the formation accuracy of the substrate, the light transmission layer 87 is 550 μm minimum and 575 μm maximum away from the incidence plane. That is, the position of the DVD layer 81 is 550 to 575 μm from the incidence plane 73. The formation accuracy of ±12.5 μm is severer than the formation accuracy of ±15 μm in the thin single layer, but is less severe than the formation accuracy of ±9.5 μm in HD DVD (in a case where the maximum value of the space layer is 25 μm).

The thickness of the space layer 85 has a minimum value of 578 μm−550 μm=28 μm and a maximum value of 622 μm−575 μm=47 μm, taking into account that the position of the HD DVD layer 83 has to be in the range of 578 to 622 μm. Therefore, as the formation accuracy of the DVD signal substrate 71 is increased, the maximum value of the space layer 85 increases that much. Conversely, if the formation accuracy is decreased, the maximum value decreases that much. If the formation accuracy of the signal substrate 71 is 2p (p is 15 μm or less), the maximum value of the space layer can be expressed by 622−(550+2p) μm.

Taking the case of HD DVD (10 μm p−p) into account, an adhesion accuracy of about 16 μm p−p is sufficiently possible. In that case, to make crosstalk between layers as small as possible, it is desirable that the space layer should be set in the range of 31 to 47 μm.

<Reflectivity and Others>

For the optical disc to be recognized as a single-sided thin single layer disc with one of the conventional DVD apparatuses commercially available in large quantities, the optical signal Irs from the DVD layer 81 has to be 45% or more of the incident light Ir with respect to the red laser beam 30 as shown in FIG. 9. If the blue-violet laser beam 60 is irradiated onto the same optical disc, the optical signal Ibs from the HD DVD layer 83 must be large enough to be subjected to focus servo and tracking servo and be reproduced.

The Reflectivity for blue-violet laser light is determined in the HD DVD standard as follows:

In the case of HD DVD-ROM
Single-sided single layer disc: 40% to 70% (including birefringence)
Single-sided dual layer disc: 18% to 32% (including birefringence)
HD DVD-Rewritable (at System Lead-in area)
Single-sided single layer disc: 4% to 8% (including birefringence)

where the upper limit is twice or less as large as the lower limit in the determined reflectivity.

It is desirable that the reflectivity of a disc of this invention with respect to the blue-violet laser beam should fall in the determined reflectivity range of the single-sided dual layer disc of HD DVD-ROM. Since HD DVD has not been produced on a commercial basis, new requirements for the HD DVD layer of the optical disc can be added to the HD DVD standard in the range where the focus servo and tracking servo are applied stably. In that case, it is desirable that the lower limit of the reflectivity should be larger than that of an HD DVD-Rewritable disc.

In the case of a single-sided dual layer DVD disc shown in FIG. 4, since the reproducing light is the red laser beam 30, Au or Si is generally used as a translucent film in the first recording layer 21. In the second recording layer 23 of a high reflection film, low-cost Al alloy is used.

In the case of HD DVD shown in FIG. 6, however, use of Au or Si makes it difficult to form a translucent film in a suitable range for the blue-violet laser beam. Therefore, the translucent first recording layer 51 may be made of Ag alloy and the high-reflection second recording film 53 may be made of Ag alloy or Al alloy.

The basic idea of this invention will be explained, taking the above various requirements into account. To reproduce the data in the DVD layer 81 with the red laser beam 30, the optical signal Irs from the layer 81 has to be 45% (the reflectivity of the DVD disc) or more of the incident light Ir. Optical noise Irn which has passed through the DVD layer and been reflected at the HD DVD layer 83 should be as small as possible. This means that the DVD layer 81 should have a higher reflectivity and a lower transmittance with respect to the red laser beam. When the data in the HD DVD layer 83 is reproduced, the transmittance of the DVD layer 81 should be higher (the reflectivity should be lower) and the reflectivity of the HD DVD layer 83 should be higher. Therefore, it is desirable that reflection film materials for the DVD layer and HD DVD layer should meet these requirements.

In HD DVD, BCA (Burst Cutting Area) is indispensable. It is desirable that the BCA should be cut by a high-power semiconductor laser beam. Presently, if the reflection film is made of Al alloy, cutting can be done using the power of a high-power semiconductor laser beam.

As for the thickness of the reflection film provided on the HD DVD layer, the track pitch is 0.4 µm and the shortest mark length is 0.2 µm in the case of HD DVD-ROM. This means that the shape of an emboss pit has a diameter of about 0.2 µm at the top and a smaller diameter at the bottom (on the substrate side). To increase the reflectivity of the HD DVD layer, the film thickness is increased. However, increasing the film thickness would cause the reflection film to crush the emboss pit. Since it is said that a suitable thickness of Al alloy is about 23 nm, this value was used here. At this time, the reflectivity of Al alloy with respect to red laser light is 63.3% and the reflectivity of Al alloy with respect to blue-violet laser light is 62.3%. As the film thickness of Al alloy is increased, the reflectivity with respect to blue-violet laser light increases.

Figure 11A:
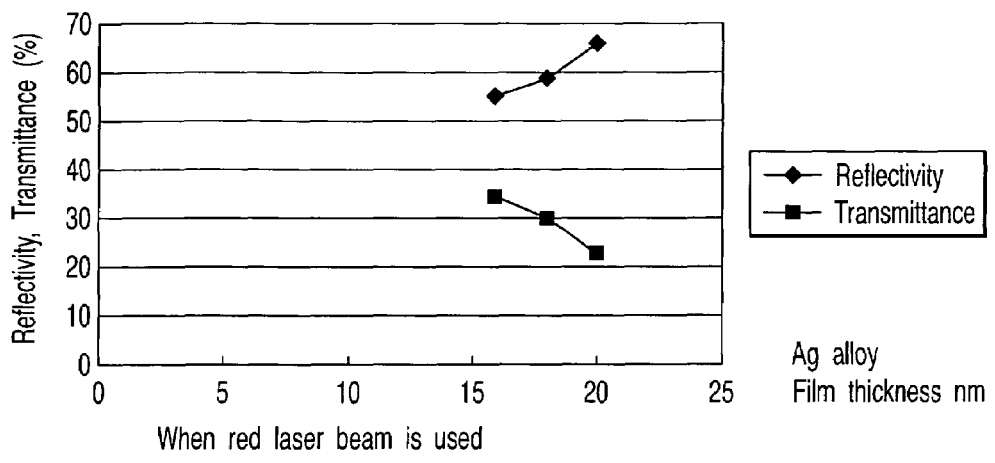
FIGS. 11A and 11B show actual measurement values of the reflectivity and refractive index of an Ag alloy film.
Figure 11B:
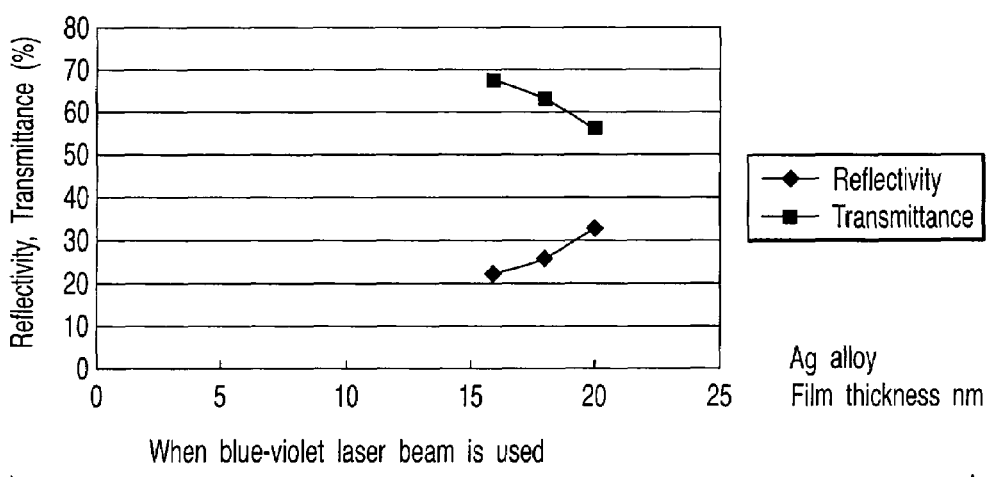

Thus, it is possible to increase the reflectivity in the range where the emboss pit does not crush. In this case, too, since the bottom of the emboss pit has to be seen, about 30 nm is a limit. At that time, the reflectivity with respect to blue-violet laser light increases by about 10%. FIGS. 11A and 11B show the results of measuring the reflectivity and transmittance by providing an Ag alloy film on a polycarbonate substrate (i.e., a plastic material used for an optical disc) and irradiating red laser light (see FIG. 11A) and blue-violet laser light (see FIG. 11B). In the case of the Ag alloy, the reflectivity characteristic of reflectivity and the transmittance characteristic are inversely related to each other, which shows that the Ag alloy is a suitable material for use in the present invention.

Figure 12A:
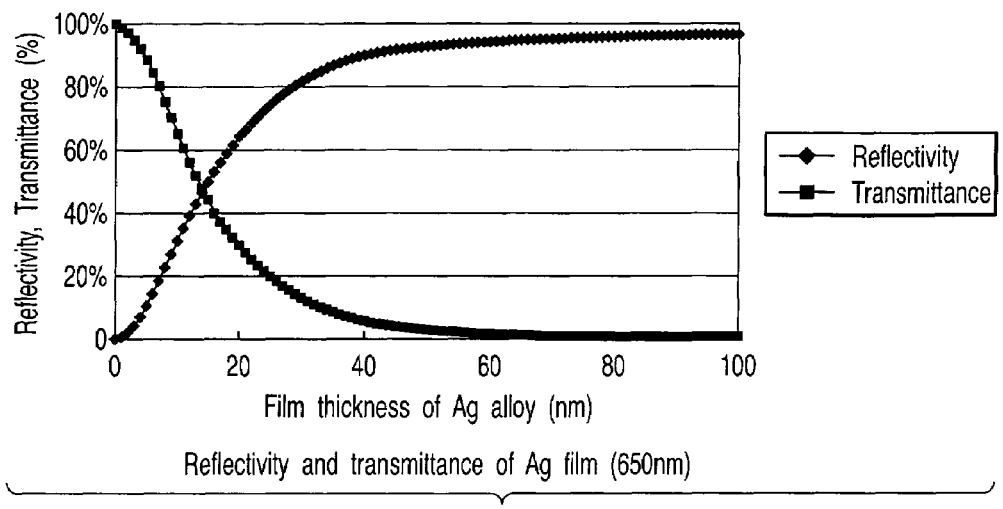
FIGS. 12A and 12B show examples of calculated values of the reflectivity and transmittance of an Ag alloy film.
Figure 12B:
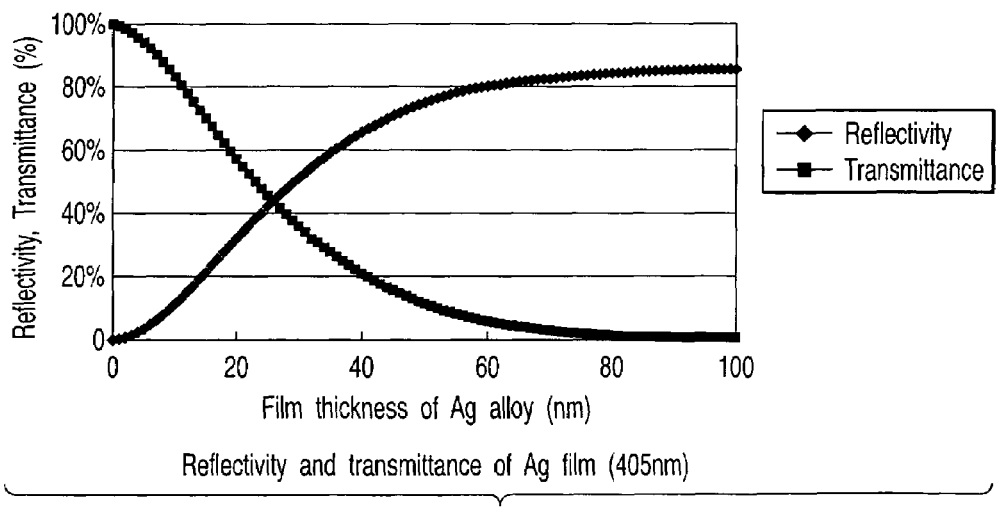

On the basis of this data, n (refractive index) of and k (extinction coefficient) of Ag alloy were assumed and the reflectivity and transmittance of an Ag film were calculated. FIG. 12A shows a case where red laser light (650 nm) was used. FIG. 12B shows a case where blue-violet laser light (405 nm) was used. In the examples of calculations below, the data in FIGS. 12A and 12B were used.

As for the representation of reflectivity, the reflectivity of a disc or the reflectivity of a recording film means (the optical signal from the disc/incident light)×100%, including all factors. On the other hand, the reflectivity of the disc surface, the reflectivity of the recording film, the transmittance, and the like are values which include no other factor. The reflectivity of a DVD disc or the reflectivity of a DVD layer is Irs/Ir when the data in the DVD layer is reproduced with red laser light. The reflectivity of an HD DVD disc or the reflectivity of an HD DVD layer is Ibs/Ib when the data in the HD DVD layer is reproduced with blue-violet laser light. It should be noted that a DVD disc differs from a DVD layer differs from each other in the definition of reflectivity.

CALCULATION EXAMPLE 1

In FIG. 9, the reflected light when the red laser beam 30 is caused to enter the optical disc 70 will be calculated. The reflectivity (Rrs) at the incidence plane, which is determined by the refractive index of the first substrate 71 with respect to the red laser beam 30, is 4.8% (without antireflection). Since the light transmission layer 87 is also used as a light transmission layer for the HD DVD layer, if the birefringence is 60 nm in double pass, a decrease in the amplitude due to birefringence is 8.2% maximum. Hereinafter, a case where the birefringence is 60 nm (the worst) will be explained.

First, for the optical signal Irs from the DVD layer 81 to be 45% or more of the incident light Ir, the reflectivity Rr1 of the DVD layer is 54% (=45%/(0.952$^2$×0.918)). From FIG. 12A, the film thickness of the Ag alloy is 16 nm and the transmittance of the translucent DVD layer 81 with respect to the red laser beam 30 is 40.8%. Since the reflectivity of the HD DVD layer 53 made of Al alloy is 63.3%, optical noise Irn from the HD DVD layer 53 is 8.8% (=0.952$^2$×0.918×0.408$^2$×0.633× 100%) of the incident light Ir. This value is ⅕ or less of the optical signal.

Next, the reflectivity when the blue-violet laser beam 60 shown in FIG. 10 is caused to enter the optical disc will be calculated. When the blue-violet laser beam 60 is used, the reflectivity (Rbs) at the incidence plane is 5.3% and a decrease in the amplitude due to birefringence (60 nm in double pass) of the light transmission layer 87 is 20% maximum. From FIG. 12B, since the transmittance of the 16 nm thickness DVD layer 81 that is translucent with respect to the blue-violet laser beam is 68.5%, the transmittance is 22.5%, and the reflectivity Rb2 of the HD DVD layer 83 made of Al alloy is 62.3%, the optical signal Ibs is 21% (=0.947$^2$×0.8×

$0.685^2 \times 0.623 \times 100\%$) of the incident light Ib. Optical noise Ibn from the DVD layer is 16.1% ($=0.947^2 \times 0.8 \times 0.225 \times 100\%$) of the incident light Ib.

What it comes down to is:

Red Laser Beam $$Irs/Ir=0.45$$

$$Irn/Ir=0.952^2 \times 0.918 \times 0.408^2 \times 0.633=0.088$$

Blue-violet Laser Beam $$Ibs/Ib=0.947^2 \times 0.8 \times 0.685^2 \times 0.623=0.21$$

$$Ibn/Ib=0.947^2 \times 0.8 \times 0.225=0.161$$

CALCULATION EXAMPLE 2

In the above calculation example, calculations were done, provided that the optical signal Irs from the DVD layer with respect to the red laser beam is 45% or more of the incident light Ir. Actually, it is desirable that there should be more allowance. Therefore, if the value of Irs/Ir is 50%, the reflectivity of the DVD layer with respect to the red laser beam is 60% ($=50\%/(0.952^2 \times 0.918)$). From FIG. 12A, the film thickness of Ag at this time is 18 nm and the transmittance of the DVD layer with respect to the red laser beam is 34.6%. From FIG. 12B, the transmittance of the DVD layer with respect to the blue-violet laser beam is 63.3% and the reflectivity is 26.9%. Therefore, it follows that:

Red Laser Beam $$Irs/Ir=0.5$$

$$Irn/Ir=0.952^2 \times 0.918 \times 0.346^2 \times 0.633=0.063$$

Blue-violet Laser Beam $$Ibs/Ib=0.947^2 \times 0.8 \times 0.633^2 \times 0.623=0.179$$

$$Ibn/Ib=0.947^2 \times 0.8 \times 0.269=0.193$$

Both the DVD disc and the HD disc satisfy the specified values of the reflectivity.

Since these calculations were done on the assumption that birefringence is the largest, it is conceivable that the reflectivity may increase in an actual case.

CALCULATION EXAMPLE 3

Next, if the minimum value of the reflectivity (Irs/Ir) when data in the DVD layer is reproduced with the red laser beam is 45%, the minimum value of the reflectivity (Ibr/Ib) when data in the HD DVD layer is reproduced with the blue-violet laser beam will be calculated. If the double refractive index of the substrate is 0 nm in calculation example 1, the reflectivity of the DVD layer with respect to the red laser beam is 49.7% ($=45\%/(0.952^2 \times 1)$). From FIG. 12A, the film thickness of Ag at this time is 15 nm and the transmittance of the DVD layer with respect to the red laser beam is 44.2%. From FIG. 12B, the transmittance of the DVD layer with respect to the blue-violet laser beam is 71% and the reflectivity is 20.3%. Therefore, it follows that:

Red Laser Beam $$Irs/Ir=0.45$$

$$Irn/Ir=0.952^2 \times 1 \times 0.442^2 \times 0.633=0.112$$

Blue-violet Laser Beam $$Ibs/Ib=0.947^2 \times 1 \times 0.71^2 \times 0.623=0.282$$

$$Ibn/Ib=0.947^2 \times 1 \times 0.203=0.182$$

That is, when data in the HD DVD layer is reproduced with the blue-violet laser beam 60, the reflectivity of the HD DVD disc increases to (Ibs/Ib) 28.2%.

From this calculation, it is found that the maximum of the reflectivity of the HD DVD disc is about 29%. Normally, the ratio of the maximum to the minimum of the reflectivity is determined to be twice or less. Therefore, in this case, the minimum value may be set at about 15%.

Accordingly, the reflectivity of the HD DVD disc is 15% to 29%.

CALCULATION EXAMPLE 4

Similarly, when the reflectivity of the HD DVD disc is 15% minimum, the maximum value of the reflectivity of the DVD disc will be calculated (without birefringence). In calculation example 3, if the transmittance of the DVD layer with respect to the blue-violet laser beam is T, this gives:

$$Ibs/Ib=0.947^2 \times 1 \times T^2 \times 0.623=0.15$$

From this, the transmittance of the DVD layer with respect to the blue-violet laser beam is 51.8%. From FIG. 12B, the film thickness of Ag alloy at this time is 22.6 nm and the reflectivity for the red laser beam is 71.2%. Therefore, it follows that:

Red Laser Beam $$Irs/Ir=0.952^2 \times 1 \times 0.712=0.645$$

$$Irn/Ir=0.952^2 \times 1 \times 0.235^2 \times 0.633=0.032$$

Blue-violet Laser Beam $$Ibs/Ib=0.947^2 \times 1 \times 0.518^2 \times 0.623=0.15$$

$$Ibn/Ib=0.947^2 \times 1 \times 0.37=0.332$$

From the above calculations, it is found that the maximum value of the reflectivity of the DVD disc is about 65%. Therefore, the reflectivity of the DVD disc is 45% to 65%.

<Interlayer Crosstalk and Space Layer>

Next, interlayer crosstalk and the thickness of the space layer will be considered. In FIG. 9, while data is being reproduced from the DVD layer 81 with red laser light, the light passed through the layer 81 is reflected by the HD DVD layer 83 behind and passes through the DVD layer 81 again. Since the reproducing optical system has the function of forming an image of the HD DVD layer 81 on the surface of the photodetector, optical noise Irn reflected at the DVD layer 83 contributes to the photodetector by the square of the thickness of the space layer.

In the single-sided dual layer DVD disc shown in FIG. 4, the minimum value of the space layer is determined to be 40 μm. At this value, interlayer crosstalk is at a negligible level. The reflectivity of the first recording layer 21 is determined so that the reflected lights from the two layers may be almost the same.

In calculation example 1, when data is reproduced from the DVD layer 81 with red laser light 30, optical noise Irn/Ir from the HD DVD layer 83 is 8.8% of the incident light and therefore it is 1/5.1 ($=8.8/45$) of 45% of the optical signal Irs/Ir. This means that, even if the value decreases to 17.6 μm ($=40$ μm$/\sqrt{5.1}$) with the space layer having a minimum value of 40 μm, the amount of interlayer crosstalk is the same.

Next, a case where data in the HD DVD layer 83 is reproduced with the blue-violet laser beam 65 will be considered. Since optical signal Ibs/Ib is 21% of the incident light and optical noise Ibn/Ib is 16.1% of the incident light, even if the space layer decreases to 13.2 μm ($=15$ μm$\times\sqrt{0.77}$) with the space layer having a minimum value of 15 μm, the amount of interlayer crosstalk is the same.

From the above consideration, it is found that inlayer crosstalk is not a problem, as long as the space layer is in the range of 28 to 47 μm. In calculation example 2, since $I_{rs}/I_r$ is 50% and $I_{rn}/I_r$ is 6.3% with respect to the red laser beam, interlayer crosstalk in reproducing data in the DVD layer is smaller than in calculation 1 and therefore is not a problem. In the case of the blue-violet laser beam, since $I_{bs}/I_b$ is 17.9% and $I_{bn}/I_b$ is 19.3%, the space layer increases a little to 15.6 μm ($=15\ \mu m \times \sqrt{(19.3)/(17.9)}$). However, there is no problem if the space layer is in the range of 28 to 47 μm.

In calculation 3, optical noise $I_{rn}/I_r$ is 11.2% of the incident light with respect to the red laser beam and therefore it is ¼ ($=8.8/45$) of 45% of the optical signal $I_{rs}/I_b$ (birefringence: 60 nm). This value decreases to 20 μm ($=40\ \mu m \times \sqrt{4}$) with the space layer having a minimum value of 40 μm. However, there is no problem if the space layer is in the range of 28 μm to 47 μm. In the case of the blue-violet laser beam, since $I_{bn}/I_b$ (18.2%) is smaller than $I_{bs}/I_b$ (28.2%), there is no problem.

In calculation example 4, since optical noise $I_{rn}/I_r$ is 3.2% with respect to the red laser beam, there is no problem. In the case of the blue-violet laser beam, since $I_{bs}/I_b$ is 15% and $I_{bn}/I_b$ is 33.2%, the space layer increases a little to 22.3 μm ($=15\ \mu m \times \sqrt{(33.2/15)}$). However, there is no problem if the space layer is in the range of 28 to 47 μm.

What it comes down to is:
The reflectivity of DVD: 45% to 65%
The reflectivity of HD DVD: 15% to 29%
The film thickness of Ag alloy: 15 nm to 23 nm
<Flag Information>

Next, a set of flags in an optical disc of the present invention will be explained. The DVD layer 81 has to be treated as an ordinary single-sided single layer DVD disc. ID of Data frame and BP2 in Physical format information in the Control data zone are set as a single-sided single layer disc.

In the HD DVD layer 83, ID of Data frame and BP2 in Physical format information in the Control data zone are set as a single-sided single layer disc.

It is desirable that a flag which indicates that an optical disc of this invention has two layers, a DVD layer and an HD DVD layer, should be set in a reserved bit in a disc structure where (BP2) is in Physical format information in the Control data zone. There are two reserved bits: one is b7 and the other is b3 unused in Layer type. This bit is reserved not only in ROM but also Rewritable and R, which therefore means that the bit has no effect.

(BP2) Disc Structure
b3 0b reserved
  1b DVD layer is allocated to the first layer and HD DVD layer is allocated to the second layer
<Reproduction by an Optical Disc Apparatus Complying with the DVD Standard>

Figure 13:
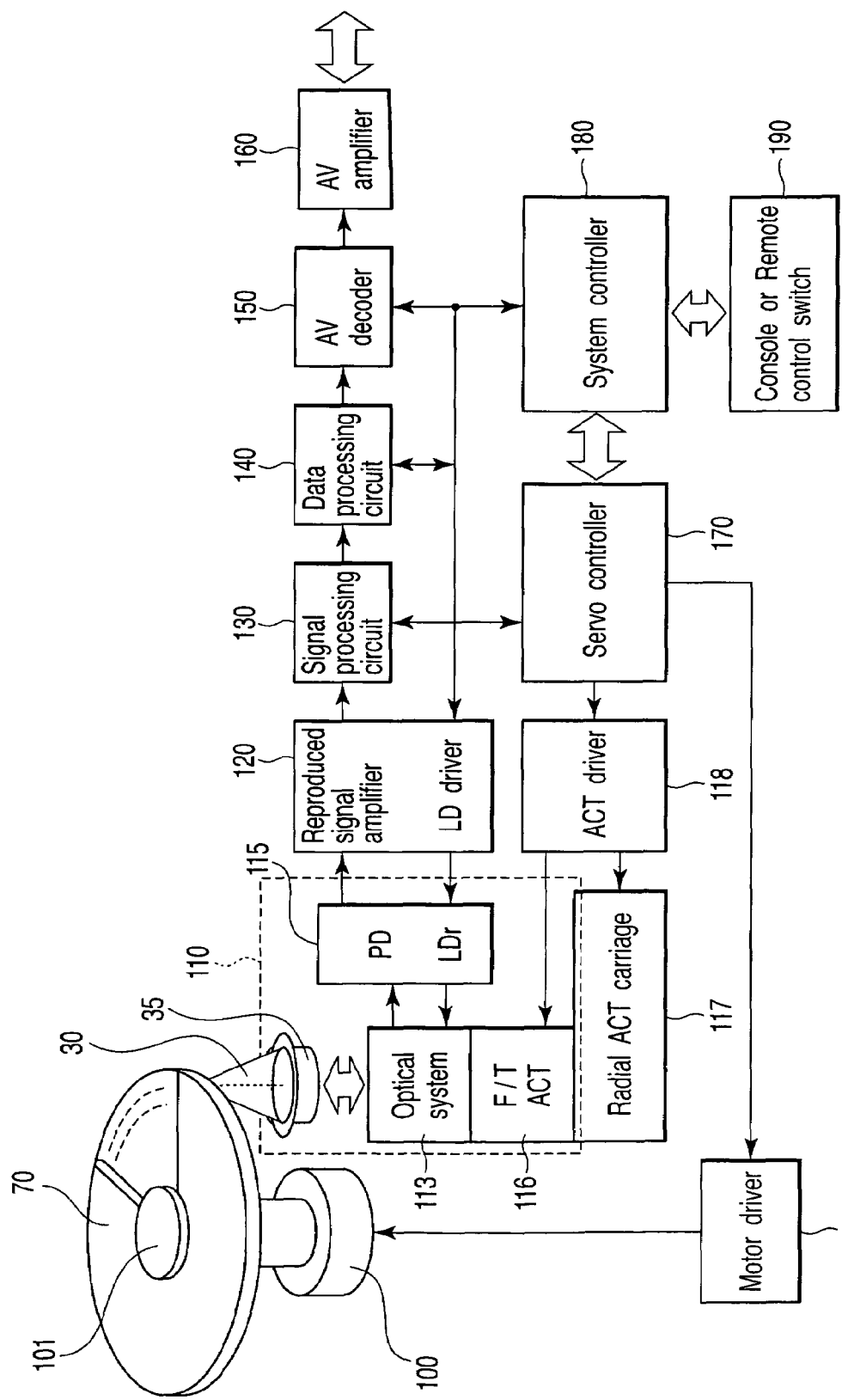
FIG. 13 shows a configuration of an optical disc apparatus complying with the DVD standard.
Figure 14B:
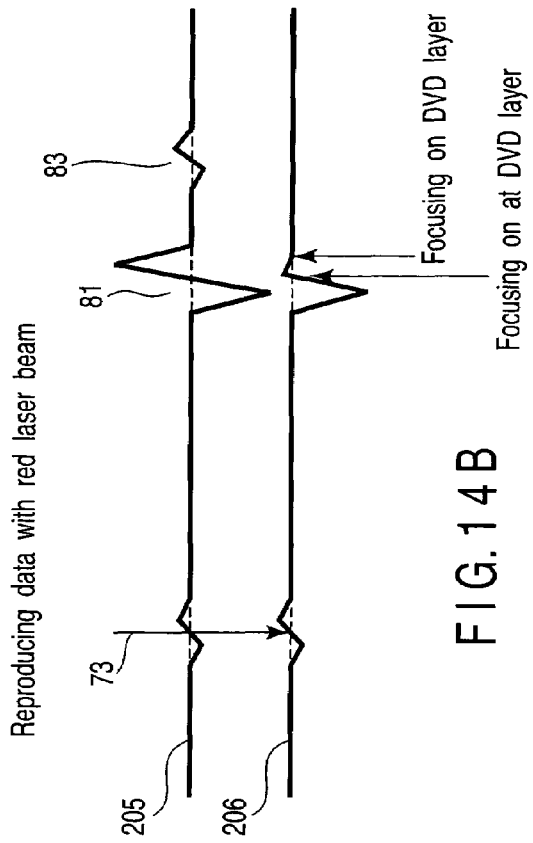
FIG. 14B shows an example of focus signals in FIG. 14A.
Figure 14A:
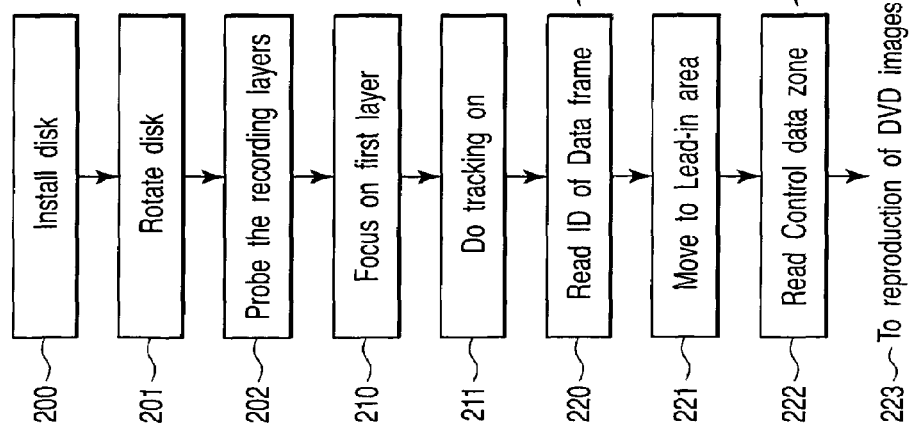
FIG. 14A is a flowchart to help explain the operation of the optical disc apparatus complying with the DVD standard.

Next, a case where a disc of this invention is played back on a conventional DVD apparatus will be explained using FIGS. 13 and 14. FIG. 13 shows the main configuration of a well-known DVD apparatus. FIG. 14 is a flowchart to help explain the operation of the DVD apparatus and its focus servo.

The main configuration of the DVD apparatus will be explained briefly. A spindle motor 100 rotates a turntable. A damper 101 holds an optical disc 70 in place on the turntable. The spindle motor 100 is controlled by a motor driver 102. An optical head 110 includes an objective lens 35 and an optical system 113. The optical system 113 is driven by a focus and tracking actuator 116. When the focus and tracking actuator 116 is controlled by an actuator driver 118, the laser beam is focused on a track on the optical disc and follows the track. A radial actuator 117 is used to move the optical head 110 in the direction of radius of the optical head 110 and is controlled by the actuator driver 118.

The reflected light from the disc is taken out of the optical system 113 and is converted into an electric signal at a photodetector in a conversion unit 115. The electric signal is gain-adjusted at a reproduced signal amplifier in a gain adjusting unit 120 and the resulting signal is input to a signal processing circuit 130. The signal processing circuit 130 performs a demodulating process, buffering, error correction, and others and inputs the resulting signal to a data processing circuit 140. The data processing circuit 140 performs packet separation, control signal separation, and the like and inputs video and audio information to an AV decoder 150. The video signal, audio signal, sub-video signal, and the like demodulated at the AV decoder 150 are output as a baseband signal via an AV amplifier 160.

Using a focus error signal and tracking error signal obtained by, for example, processing numerically the reproduced signal from a 4-quadrant photodiode, a servo controller 170 supplies a control signal to the actuator driver 118. In response to a signal from console (e.g., a remote controller or an operation key input section) 190, a system controller 180 controls the playback, stop, and temporary stop of the apparatus, and the like. In addition, the system controller 180 controls the laser diode driver in the gain adjusting unit 120. The laser diode driver drives the laser diode installed in the optical head 110, thereby outputting a red laser beam 30.

When an optical disc 70 of the present invention is installed in the DVD apparatus, the spindle motor 100 is rotated until a specific number of revolutions has been reached (steps 200, 201 in FIG. 4A). Next, a periodic driving current is caused to flow through the focus actuator 116, thereby moving the optical head up and down in the direction of axis (in step 202 in FIG. 4A). A focus signal 205 produced from the reproduced signal appears periodically (refer to the focus signal in FIG. 4B). Since the level of the focus signal from the DVD layer is six to eight times the level of the signal from the HD DVD layer in a disc of the present invention with a DVD-side reflectivity of about 50%, the DVD apparatus recognizes the disc as a single-sided single layer DVD disc and focuses on the DVD layer (step 210 in FIG. 4A) as shown by numeral 206 (step 210 in FIG. 4A).

Then, after a short stabilization time elapses, the DVD layer is focused on (step 210). Then, the tracking servo is turned on (step 211 in FIG. 4A), thereby tracking on a suitable position of the disc. In this state, ID of Data frame is read (step 220 in FIG. 4A), Area type, Reflectivity, Layer number, and others of the disc are checked. Then, the radial actuator 117 is driven, moving the optical head 110 to the lead-in area (step 221 in FIG. 4A). Next, the optical head is moved to the Control data zone (step 222 in FIG. 4A) and reads Number of layers and Layer type from (BP2) in Physical formation information, thereby verifying that the disc is a single-sided single layer DVD disc, which is followed by the reproduction of DVD images (step 223).

Depending on the apparatus, the disc might be determined to be a single-sided dual layer DVD disc, although the level of the signal from the HD DVD layer is small. In this case, generally, since the first layer (L0 layer) is focused on and then is tracked on, thereby reading the Lead-in information in L0 layer. In this case, too, the disc is determined to be a single-sided single layer disc, which is not a problem. The data in the HD DVD might be read by accident. However, the level of the signal from the HD DVD layer is so small that the HD DVD layer cannot be focused on and therefore the first layer is focused on again. If the HD DVD layer is focused on, since the data in the HD DVD layer cannot be read, the DVD layer is read gain. Therefore, there is no problem. Once the data in the DVD is read, the disc of the present invention is recognized to be a single-sided single layer DVD, which is treated as DVD.

<Reproduction by an Optical Disc Apparatus Complying with the HD DVD Standard>

Next, an HD DVD apparatus using blue-violet laser light will be explained using FIGS. 15, 16A, and 16B. Since the HD DVD apparatus has almost the same functional blocks as in the configuration of the DVD apparatus shown in FIG. 13, the like parts are indicated by the same reference numerals in FIG. 13. In the case of the HD DVD apparatus, a laser diode that outputs blue-violet laser light is provided in a photoelectric conversion unit 115. The objective lens 65 differs from the objective lens 35 in numerical aperture.

The comparison of a disc of this invention with a single-sided dual layer HD DVD disc has shown that the reflectivity of each layer is almost at the same level. Thus, it is difficult to determine the distinction between the two discs from the difference in reflectivity. Moreover, since BCA is formed in the second layer in both cases, it is also difficult to make a determination on the basis of the presence or absence of BCA. Therefore, actually, focus servo and tracking servo are applied and a determination is made on the basis of the signal levels. Since the HD DVD apparatus has been newly made, the recording layers are probed. If it is determined that the disc is a dual layer disc, then the second layer is read first.

Figure 16:
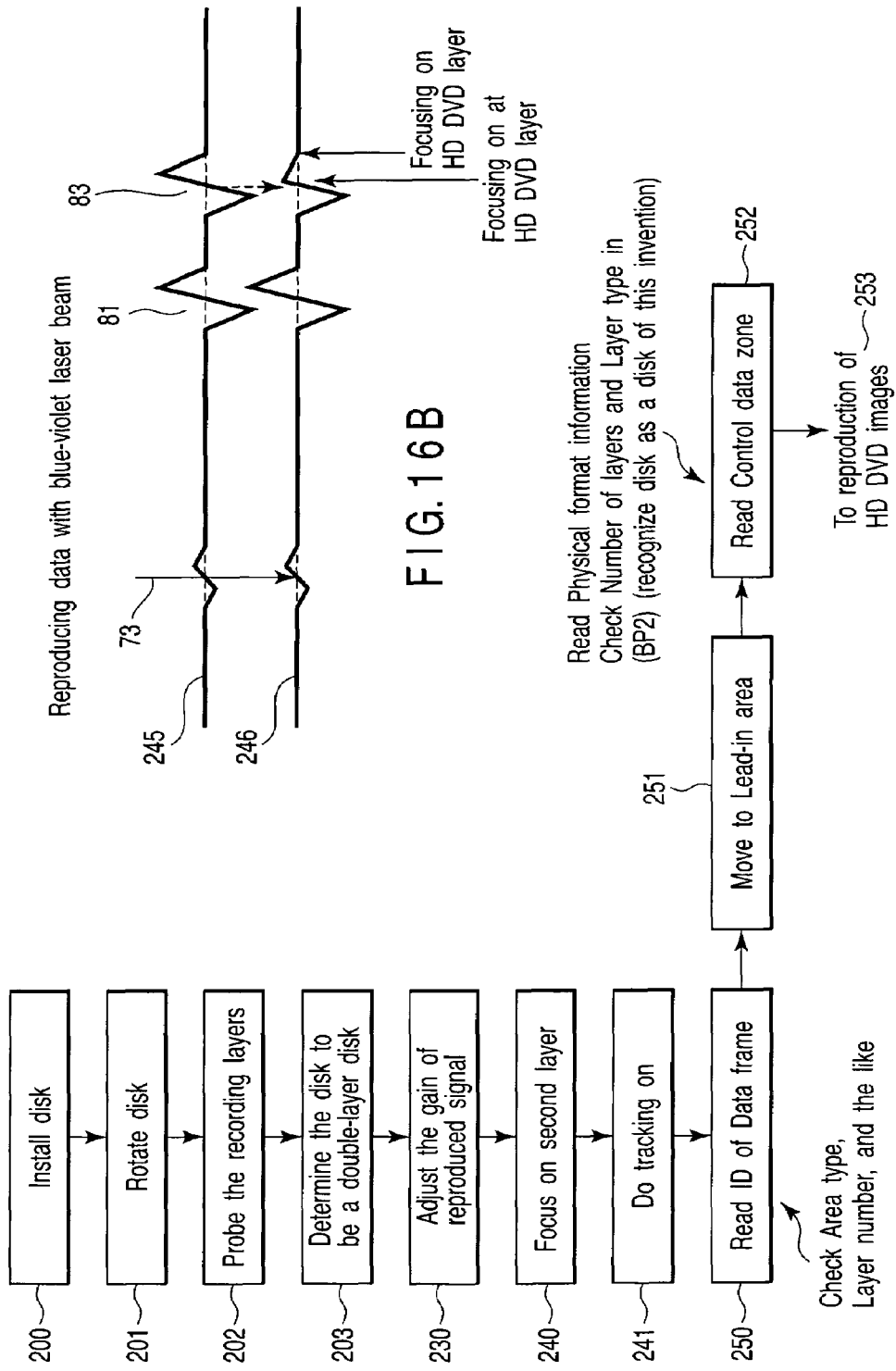
FIG. 16A is a flowchart to help explain the operation of the optical disc apparatus complying with the HD DVD standard.
FIG. 16B shows an example of focus signals in FIG. 16A.

First, a periodic driving current is caused to flow through the focus actuator (ACT) 116, thereby probing the recording layers (step 202 in FIG. 16A). From the focus signal 245, it is determined that the disc is a dual layer disc (step 203 in FIG. 16A). Then, the gain of the reproduced signal is adjusted (step 230 in FIG. 16A) and the HD DVD layer of the second layer is focused on (step 240 in FIG. 16A). After a short stabilization time elapses, the HD DVD layer goes into the on-focused state. Then, the tracking servo is turned on (step 241 in FIG. 16A), which causes the disc to be tracked on in a suitable position.

Then, ID of Data frame is read (step 250 in FIG. 16A), Area type, Layer number, and others of the disc are checked. Then, the radial actuator 117 is driven, moving the optical head to the Lead-in area (step 251 in FIG. 16A). Next, the optical head is moved to the Control data zone (step 252 in FIG. 16A) and reads Number of layers and Layer type from (BP2) b3 in Physical format information, thereby verifying that the disc is a disc of this invention, which is followed by the reproduction of HD DVD images (step 253 in FIG. 16A).

Even if the optical head has jumped to the first layer by accident, it cannot read the information in the first layer (DVD) and therefore is caused to jump to the second layer again. Accordingly, there is no problem.

When a single-sided dual layer HD DVD is installed, the second layer has no lead-in information. Therefore, the optical head determines that the disc is an ordinary HD DVD disc and jumps to the first layer to reproduce data. Accordingly, there is no problem.

<Reproduction by an Optical Disc Apparatus Complying with Both of the DVD Standard and HD DVD Standard>

Next, a compatible apparatus of the present invention using both of red laser light and blue-violet laser light will be explained using FIGS. 17 and 18.

Figure 15:
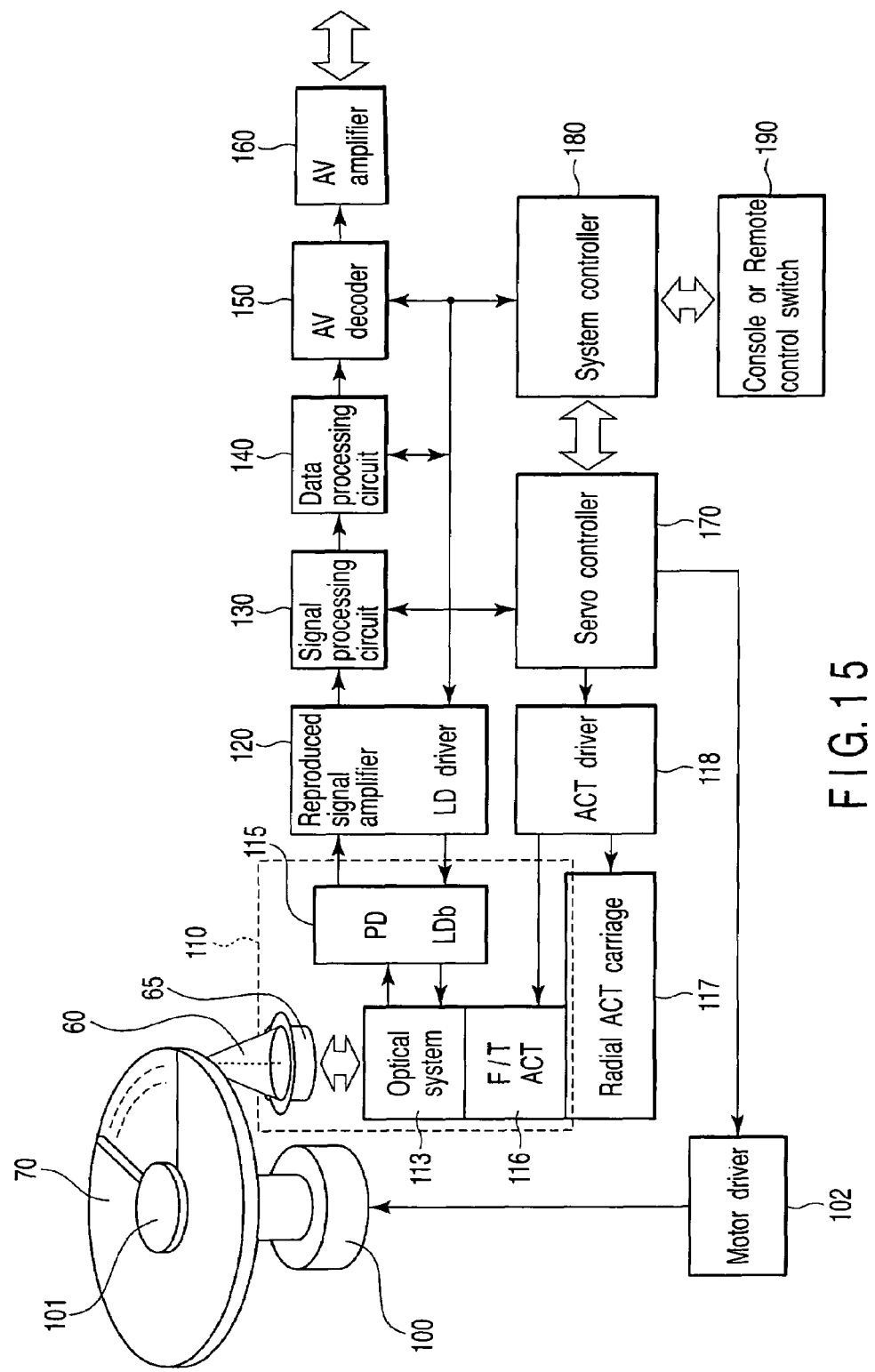
FIG. 15 shows a configuration of an optical disc apparatus complying with the HD DVD standard.

As shown in FIG. 17, since the compatible apparatus has almost the same functional blocks as in the configuration of the DVD apparatus shown in FIG. 13 and in the configuration of the HD DVD shown in FIG. 15, the like parts are indicated by the same reference numerals in FIGS. 13 and 15. In the case of the compatible apparatus, a laser diode LDr that outputs red laser light and a laser diode LDb that outputs blue-violet laser light are provided in a photoelectric conversion unit 115. The objective lens 111 is selective according to, for example, the wavelength of a laser beam. The numerical aperture changes adaptively between a red laser beam and a blue-violet laser beam. Alternatively, the objective lens may be of the switching type.

In the compatible apparatus, first, a blue-violet laser beam is irradiated, thereby checking whether the disc is an HD DVD disc. The reason why the blue-violet laser beam is irradiated is that, when data cannot be read with the blue-violet laser beam, the red laser beam is irradiated to check whether the disc is a DVD disc. A case where CD can also be played pack is not explained here, because CD can be treated in the same manner as with the red laser beam. Moreover, the reason why the blue-violet laser beam is irradiated first is to prevent a disc of the present invention from being mistaken for an ordinary DVD disc.

When a disc of this invention is installed in the compatible apparatus, the blue-violet laser beam is turned on. Then, the focus ACT 116 is actuated, thereby probing the recording layers 202. From the focus signal, it is determined that the disc is a dual layer disc (step 203 in FIG. 18). The gain of the reproduced signal is adjusted (step 230 in FIG. 18), the HD DVD layer is focused on (step 240 in FIG. 18). Thereafter, tracking-on is done (step 241 in FIG. 18). Then, ID of Data frame is read (step 250 in FIG. 18), the optical head is moved to the Lead-in area (step 251 in FIG. 18) and reads Physical format information in the Control data zone (step 252 in FIG. 18). Then, from the flag in b3 in Layer type of Disc structure in (BP2), it is verified whether the disc is a disc of the present invention. Next, Number of layers and Layer type are checked, thereby verifying that the layer currently being accessed is an HD DVD layer, which is then followed by the reproduction of HD DVD images (step 253 in FIG. 18).

Figure 18:
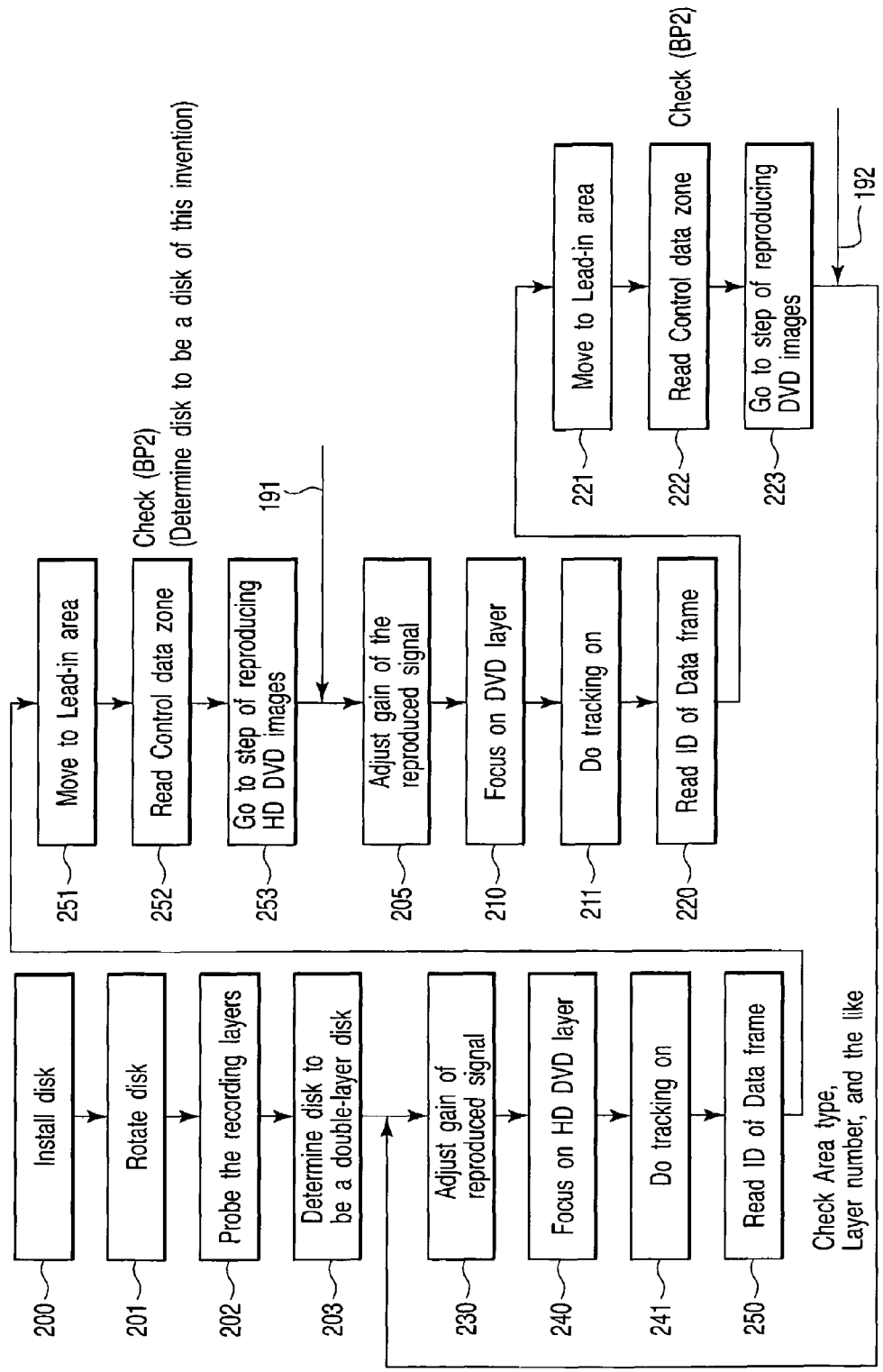
FIG. 18 is a flowchart to help explain the operation of the optical disc apparatus of this invention.

Here, if the user selects DVD by using the console 190 (numeral 191 in FIG. 18), the gain of the reproduced signal is adjusted (step 205 in FIG. 18), the DVD layer is focused on (step 210 in FIG. 18), tracking-on is done (step 211 in FIG. 18), and ID of Data frame is checked (step 220 in FIG. 18). Then, the optical head is moved to the Lead-in area (step 221 in FIG. 18) and the flag of the Control data zone is checked (step 222 in step FIG. 18), following by the reproduction of DVD images. Here, if the user selects HD DVD (numeral 192 in FIG. 18), HD DVD images can be reproduced in the aforementioned method (step 253 in FIG. 18).

As described above, with the present invention, DVD and HD DVD can be formed in a single optical disc. In this invention, an existing DVD apparatus can reproduce data from the DVD layer, an HD DVD complying with the HD DVD standard can reproduce data from the HD DVD layer, and a compatible apparatus of this invention can reproduce data from both of the DVD layer and the HD DVD layer. In addition, with the present invention, a group of products complying with the existing DVD standard is compatible with a group of products complying with the new HD DVD standard, which helps a group of products complying with the HD DVD standard to spread smoothly among ordinary users.

<Trial Manufacture of Discs and Evaluation Data>

Next, FIG. 19 shows the characteristic of an optical disc of this invention actually manufactured as an experiment. In the trial manufacture, to make the reflectivity of the DVD layer 45% or more and the reflectivity of the DVD layer 18% or more, an optical disc was manufactured experimentally with the film thickness of Al alloy in the HD DVD layer being 23 nm and the film thickness of Ag alloy in the DVD layer being 18 nm. The light transmission layer (thickness of the DVD-side substrate) was aimed at 562.5±12.5 µm (550 to 575 µm) and the thickness of the space layer was aimed at 39±8 µm (31 to 47 µm). A stamper for an existing single-sided single layer DVD disc was used as the DVD-side stamper. For this reason, the flag is for a single-sided single layer disc.

FIG. 19A shows the measured minimum values and maximum values of the light transmission layer and space layer. All of them fall in the target values. FIG. 19B shows jitter and reflectivity on the DVD side. Jitter is less than 7%, satisfying the requirement of the thin single layer disc. The maximum value and minimum value of the reflectivity are shown in FIG. 19B. Both the maximum value and minimum value are larger than 45%. It is conceivable that the difference between the minimum value and the maximum value of the reflectivity is due mainly to the effect of birefringence. The performance of DVD has fulfilled the DVD standard in terms of all of the mechanical characteristic, optical characteristic, and signal characteristic. The playability of DVD has been verified using more than 40 types of players and drives. From the verification, it is found that there is no problem.

Figure 20:
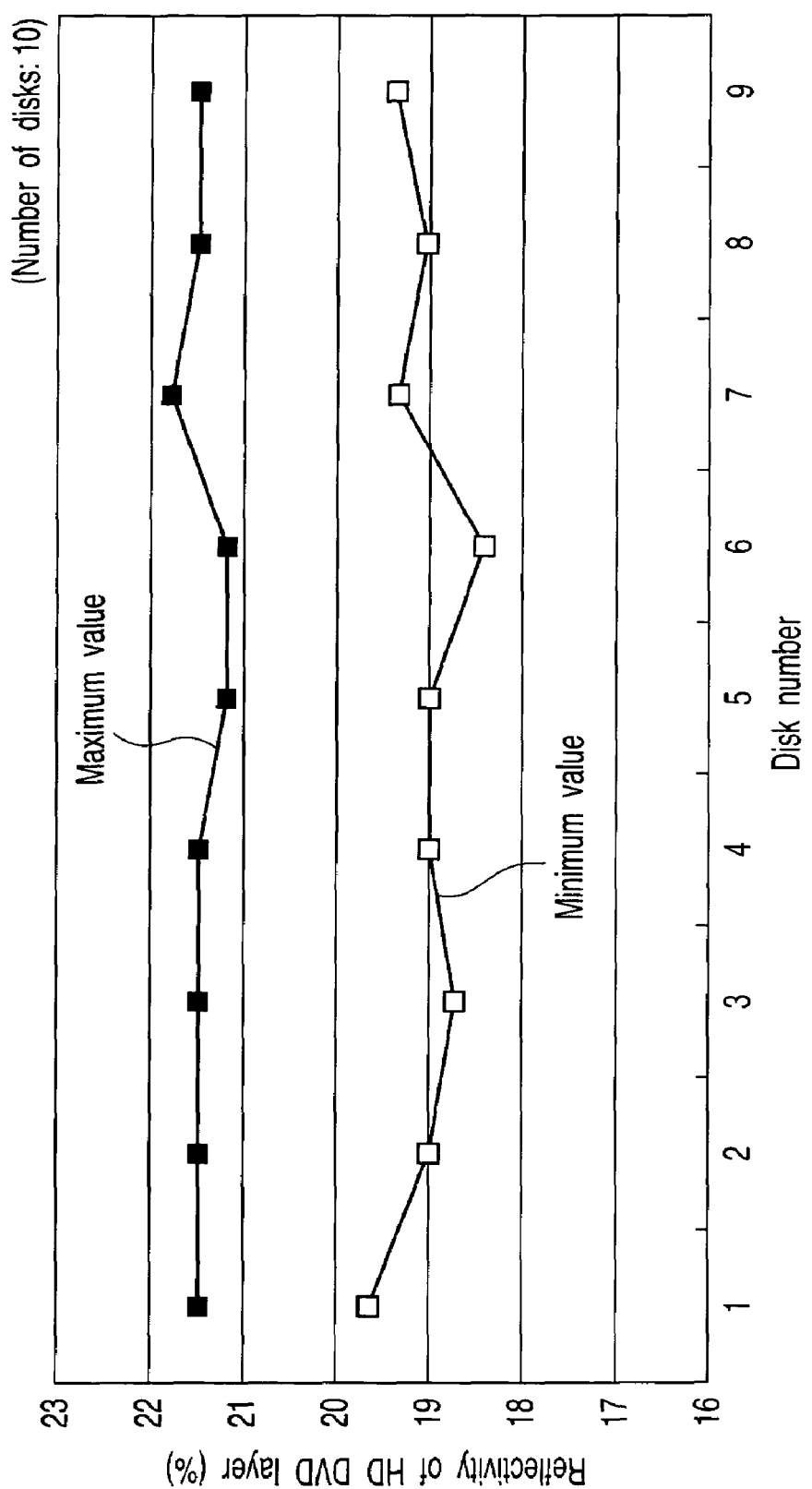
FIG. 20 shows an example of the reflectivity characteristic of an HD DVD optical disc related to the present invention.

FIG. 20 shows a reflectivity characteristic of the HD DVD side of a disc according to the present invention. In the measurement, the minimum values and maximum values of the reflectivities of 10 optical discs of samples were measured. The reflectivities of all the optical discs fall in the range of 18% to 22%. From this, it is found that the target can be cleared. It is conceivable that variations in the maximum value and minimum value are due mainly to the effect of birefringence. The reason why the fluctuation range of HD DVD is larger than that of DVD is that the effect becomes greater as the wavelength becomes shorter, even if the birefringence has the same value. The experimental disc fulfils the HD DVD standard in terms of all of the mechanical characteristic, optical characteristic, and signal characteristic, except for reflectivity.

Other Embodiments

In the above embodiment, the translucent film of the first recording layer has been made of Ag alloy. If reflectivity and transmittance can be selectively set for each of the two laser beams differing in wavelength, the apparatus can be operated more efficiently. For example, the first recording layer may be made of a combination of a multiple interference film and pigment (organic dye) or the like. In addition, while the second recording layer has been made of an Al alloy film, it may be made of an Al alloy film or an Au film. Moreover, a film made of a combination of a wavelength-selective multiple interference film whose reflectivity is larger in blue violet and smaller in red and pigment or the like may be used. Since the loss at the surface of the optical disc is large, an antireflection film may be provided. Furthermore, while the minimum value of reflection from the second recording layer has been 15% in the present invention, it is possible to decrease the minimum value to less than 15%, because 4% to 8% have been used in HD DVD-rewritable discs.

The position of the first recording layer and the thickness of the space layer depend on the formation accuracy of the substrate and the production accuracy of the space layer. Therefore, if the position of the first recording layer and the thickness of the space layer are near the values shown in the embodiments, the apparatus operates effectively.

According to the present invention, it is possible to provide an optical disc which enables a first recording layer (corresponding to a DVD layer) and a second recording layer (corresponding to an HD DVD layer) to be accessed from one side with a first laser beam (red laser light) and a second laser beam (blue-violet laser light), respectively. Then, in the conventional DVD apparatus, the disc of the present invention operates as a DVD disc. In the compatible apparatus capable of dealing with both HD DVD and DVD, the disc operates as an HD DVD disc and a DVD disc. Moreover, in a device for HD DVD only, the disc of the present invention can operate as HD DVD.

Therefore, both DVD movie content and HD DVD movie content can be recorded into a single disc. That is, this disc is a combination disc capable of dealing with both SD video and HD video.

Then, a conventional DVD compatible optical disc apparatus can reproduce DVD content and a new HD DVD compatible optical disc apparatus can reproduce HD DVD movie content or both HD DVD movie content and DVD movie content.

For example, the same movie content is prepared in the form of DVD content and HD DVD content. These two movie contents are recorded or a single disc. This enables the user having only a DVD compatible apparatus to watch the DVD movie content and the user having an HD DVD compatible apparatus to watch the HD DVD movie.

If the user who does not have an HD DVD compatible apparatus buys an HD DVD compatible apparatus in the future, the user can enjoy the HD video on the already bought discs without buying a new HD DVD disc. This provides a great benefit to the user.

This invention is not limited to the above embodiments and may be embodied by modifying the component elements without departing from the spirit or essential character thereof. In addition, various inventions may be formed by combining suitably a plurality of component elements disclosed in the embodiments. For example, some components may be removed from all of the component elements constituting the embodiments. Furthermore, component elements used in two or more embodiments may be combined suitably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A single-sided dual layer optical disc comprising:
   a light transmission layer;
   a translucent first recording layer which is accessed with a first laser beam;
   an space layer; and
   a second recording layer which is accessed with a second laser beam, these layers being arranged in that order in the direction in which a laser beam enters,
   the areal recording density of the second recording layer being three times or more as high as that of the first recording layer,
   identifying information to indicate that the first recording layer has been formed being formed in the second recording layer,
   the thickness of the light transmission layer from an incidence plane to the first recording layer being 550 µm or more,
   the thickness of the light transmission layer from the incidence plane to the second recording layer being 622 µm or less, the reflectivity of the first recording layer with respect to the first laser beam being 45% to 65%, and the reflectivity of the second recording layer with respect to the second laser beam being 15% to 29%.

2. The single-sided dual layer optical disc according to claim 1, wherein the thickness of the light transmission layer from the incidence plane to the first recording layer is 575 μm or less, the thickness of the light transmission layer from the incidence plane to the second recording layer is 578 μm or more, and the thickness of the space layer is 28 to 47 μm.

3. The single-sided dual layer optical disc according to claim 1 or 2, wherein the first recording layer is made of an Ag alloy film and has a thickness of 15 to 23 nm, and the second recording layer is made of an Al alloy film and has a thickness of 30 nm or less.

4. An optical disc apparatus which reads information from a single-sided dual layer optical disc which includes a light transmission layer, a translucent first recording layer which is accessed with a first laser beam, a space layer, and a second recording layer which is accessed with a second laser beam, these layers being arranged in that order in the direction in which a laser beam enters, the areal recording density of the second recording layer being three times or more as high as that of the first recording layer, identifying information to indicate that the first recording layer has been formed being formed in the second recording layer, the thickness of the light transmission layer from an incidence plane to the first recording layer being 550 μm or more, the thickness of the light transmission layer from the incidence plane to the second recording layer being 622 μm or less, the reflectivity of the first recording layer with respect to the first laser beam being 45% to 65%, and the reflectivity of the second recording layer with respect to the second laser beam being 15% to 29%, the optical disc apparatus comprising:

an optical head capable of generating the first laser beam and the second laser beam; and control means for selectively causing either the first laser beam or the second laser beam to be generated.

5. The optical disc apparatus according to claim 4, wherein the control means selects either the first laser beam or the second laser beam on the basis of a user input from a user interface.

6. The optical disc apparatus according to claim 4 or 5, wherein the control means selects the second laser beam in an initial process of trying reading information from the installed optical disc.

7. The optical disc apparatus according to claim 6, wherein the control means, when having succeeded in reading information in the initial process, continues selecting the second laser beam until a user input to select the first laser beam has been supplied from the user interface.

8. A reproducing method of reading information from a single-sided dual layer optical disc which includes a light transmission layer, a translucent first recording layer which is accessed with a first laser beam, an space layer, and a second recording layer which is accessed with a second laser beam, these layers being arranged in that order in the direction in which a laser beam enters, the areal recording density of the second recording layer being three times or more as high as that of the first recording layer, identifying information to indicate that the first recording layer has been formed being formed in the second recording layer, the thickness of the light transmission layer from an incidence plane to the first recording layer being 550 μm or more, the thickness of the light transmission layer from the incidence plane to the second recording layer being 622 μm or less, the reflectivity of the first recording layer with respect to the first laser beam being 45% to 65%, and the reflectivity of the second recording layer with respect to the second laser beam being 15% to 29%, the reproducing method comprising:

accessing data with the second laser beam and moving the focus point back and forth in the direction of thickness of the optical disc;

focusing on the second recording layer, making a gain adjustment, turning on a focus servo, and then turning on a tracking servo;

reading ID of a data frame from the reproduced signal and checking the ID after turning on the tracking servo and then moving to a Control data zone in a Lead-in area;

verifying information on the disc type in Physical format information in the Control data zone; and reproducing the signal in the second recording layer.

9. A reproducing method of reading information from a single-sided dual layer optical disc which includes a light transmission layer, a translucent first recording layer which is accessed with a first laser beam, an space layer, and a second recording layer which is accessed with a second laser beam, these layers being arranged in that order in the direction in which a laser beam enters, the areal recording density of the second recording layer being three times or more as high as that of the first recording layer, identifying information to indicate that the first recording layer has been formed being formed in the second recording layer, the thickness of the light transmission layer from an incidence plane to the first recording layer being 550 μm or more, the thickness of the light transmission layer from the incidence plane to the second recording layer being 622 μm or less, the reflectivity of the first recording layer with respect to the first laser beam being 45% to 65%, and the reflectivity of the second recording layer with respect to the second laser beam being 15% to 29%, the reproducing method comprising:

selecting a blue-violet laser beam as a beam irradiated onto the optical disc;

moving the focus point back and forth in the direction of thickness of the optical disc;

focusing on the second recording layer, making a gain adjustment, turning on a focus servo, and then turning on a tracking servo;

going into a state where the signal in the second recording layer is reproduced;

adjusting the gain of the reproduced signal when receiving a signal to switch to the first recording layer;

focusing on the first recording layer and then turning on the tracking servo; and going into a state where the signal in the first recording layer is reproduced.

10. The reproducing method according to claim 9, further comprising:

reading ID of a Data frame from the reproduced signal in the second recording layer and checking the ID after turning on the tracking servo in the second recording layer and then moving to a Control data zone in a Lead-in area;

verifying information on the disc type in physical format information in the Control data zone; and reproducing the signal in the second recording layer.

* * * * *